United States Patent
Fujii

(10) Patent No.: US 9,248,856 B2
(45) Date of Patent: Feb. 2, 2016

(54) VEHICULAR STEERING CONTROLLER

(71) Applicant: TOYOTA JIDOSHA KABUSHIKI KAISHA, Toyota-shi, Aichi-ken (JP)

(72) Inventor: Shota Fujii, Atsugi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/554,439

(22) Filed: Nov. 26, 2014

(65) Prior Publication Data

US 2015/0151786 A1 Jun. 4, 2015

(30) Foreign Application Priority Data

Nov. 29, 2013 (JP) .................................. 2013-248725

(51) Int. Cl.
*B62D 6/00* (2006.01)
*B62D 15/02* (2006.01)

(52) U.S. Cl.
CPC .............. *B62D 6/008* (2013.01); *B62D 15/025* (2013.01)

(58) Field of Classification Search
USPC .......................................................... 701/42
See application file for complete search history.

(56) References Cited

U.S. PATENT DOCUMENTS

| | | | | |
|---|---|---|---|---|
| 6,580,988 B2* | 6/2003 | Lin | ........................ | B62D 7/159 180/443 |
| 6,671,598 B2* | 12/2003 | Laurent | .................... | B62D 1/02 180/410 |
| 7,413,267 B2* | 8/2008 | Katayama | ................. | B60T 7/22 303/165 |
| 8,073,607 B2* | 12/2011 | Sidlosky | ............... | B60T 8/1755 701/82 |
| 8,126,642 B2* | 2/2012 | Trepagnier | ............ | G01S 17/023 180/167 |
| 8,346,480 B2* | 1/2013 | Trepagnier | ............ | B60W 30/00 180/167 |
| 8,412,420 B2* | 4/2013 | Ruhter | .................. | E02F 3/7645 180/215 |
| 2003/0088350 A1* | 5/2003 | Lin | ........................ | B62D 7/159 701/41 |
| 2003/0120405 A1* | 6/2003 | Laurent | .................... | B62D 1/02 701/41 |
| 2004/0193374 A1* | 9/2004 | Hac | ..................... | B60K 31/0008 701/301 |
| 2009/0192676 A1* | 7/2009 | Sidlosky | ............... | B60T 8/1755 701/41 |
| 2011/0130923 A1* | 6/2011 | Watanabe | ............. | B60T 8/1755 701/41 |
| 2012/0041658 A1* | 2/2012 | Turner | ............... | B62D 15/0215 701/68 |
| 2013/0253773 A1* | 9/2013 | Itamoto | ................ | B62D 5/0484 701/43 |
| 2014/0145498 A1* | 5/2014 | Yamakado | ............ | B60T 8/1755 303/3 |

FOREIGN PATENT DOCUMENTS

JP 2012-051441 A 3/2012
WO 2011/042791 A1 4/2011

* cited by examiner

*Primary Examiner* — Thomas Tarcza
*Assistant Examiner* — Alex C Dunn
(74) *Attorney, Agent, or Firm* — Sughrue Mion, PLLC

(57) ABSTRACT

A vehicular steering controller includes an operating section for operating an actuator for steering-controlling a tire angle, a consistency-determining section, and a contribution ratio-increasing section. When a steering angle of a steering wheel is greater than or equal to a predetermined angle, the consistency-determining section determines whether consistency between first steering of the vehicle corresponding to an input operation performed on the steering wheel and second steering based on the target path is greater than or equal to a predetermined value. When the operating section operates the actuator based on the input operation performed on the steering wheel, the contribution ratio-increasing section increases a contribution ratio in which the target operation amount of the actuator contributes to an actual operation amount of the actuator by the operating section, provided that the consistency is greater than or equal to the predetermined value.

16 Claims, 14 Drawing Sheets

VEHICULAR STEERING CONTROLLER

BACKGROUND OF THE INVENTION

The present invention relates to a vehicular steering controller for calculating, based on a target path of a vehicle, an operation amount of an actuator that controls steering of a tire angle.

Japanese Laid-Open Patent Publication No. 2012-51441 discloses a device for automatically switching manual steering to automatic steering. This device switches steering from automatic steering to manual steering when a user's steering angle of the steering wheel is greater than or equal to a predetermined value during automatic steering. Thereafter, if the steering angle is less than the predetermined value, the device automatically switches manual steering to automatic steering. After the steering angle of the steering wheel is less than the predetermined value, if the difference between a target path and an actual path of the vehicle is less than or equal to a threshold value, the device automatically switches steering to automatic steering.

The present inventors considered a configuration in which steering is switched to automatic steering when the steering angle of the steering wheel is greater than or equal to a predetermined value. When the steering angle of the steering wheel is greater than or equal to the predetermined value, the steering angle is varied in some cases. Time is required until variation in the tire angle corresponding to variation in the steering angle is reflected in the actual direction of the vehicle. Hence, there is a concern that the target path and the actual path of the vehicle are compared with each other before the variation in the tire angle is reflected in the actual path. As a result of such comparison, if it is determined that the difference between these paths is less than or equal to the threshold value, there is a concern that the automatic steering does not match with intended steering of a user. Hence, in a state where the steering angle of the steering wheel is greater than or equal to the predetermined value, if only a fact that the difference between the paths is less than or equal to the threshold value is employed as an execution condition for switching the automatic steering, behavior of the vehicle gives the user a feeling of strangeness when the automatic steering processing is started.

This device switches between manual steering for operating an actuator which steering-controls the tire angle based on an input operation performed on the steering wheel and automatic steering for operating the actuator independently from the input operation performed on the steering wheel. In this case, when manual steering is switched to automatic steering, the device switches a contribution ratio from 0% to 100%. The contribution ratio is the ratio in which an operation amount calculated for automatic steering contributes to an operation of the actuator. In a device that executes processing for increasing the contribution ratio when automatic steering is carried out, the above-described actual circumstance that behavior of a vehicle gives a user a feeling of strangeness is also generally in common. For example, the above-described actual circumstance also applies to a device that switches the contribution ratio to a predetermined value that is less than 100% when automatic steering is carried out.

SUMMARY OF THE INVENTION

It is an objective of the present invention to provide a vehicular steering controller capable of preventing a user from feeling strangeness when executing the processing for increasing a contribution ratio in which an operation amount calculated based on a target path contributes an operation of an actuator.

To achieve the foregoing objective and in accordance with one aspect of the present invention, a vehicular steering controller is provided that includes an operating section for operating an actuator for steering-controlling a tire angle, a calculating section for calculating a target operation amount of the actuator based on a target path of a vehicle, a consistency-determining section, and a contribution ratio-increasing section. When a steering angle of a steering wheel is greater than or equal to a predetermined angle, the consistency-determining section determines whether consistency between first steering of the vehicle corresponding to an input operation performed on the steering wheel and second steering based on the target path is greater than or equal to a predetermined value. When the operating section operates the actuator based on the input operation performed on the steering wheel, the contribution ratio-increasing section increases a contribution ratio in which the target operation amount contributes to an actual operation amount of the actuator by the operating section, provided that the consistency-determining section determines that the consistency is greater than or equal to the predetermined value.

In this device, a fact that the consistency-determining section determines steering of a vehicle corresponding to an input operation performed on a steering wheel and steering based on the target path have consistency greater than or equal to a predetermined value is a condition for increasing the contribution ratio. When it is determined that there is consistency greater than or equal to the predetermined value, since steering of a vehicle corresponding to the input operation of the steering wheel and steering based on the target path are consistent with each other, it is possible to reliably prevent behavior of the vehicle from giving a user a feeling of strangeness even if the contribution ratio is increased.

When the steering angle is changed, a delay may be generated until a direction of the vehicle is changed after the steering angle has been changed. Hence, to prevent behavior of the vehicle from giving a user a feeling of strangeness by the processing for increasing the contribution ratio of the operation amount calculated by the calculation processing section when the steering angle is greater than or equal to the predetermined value, it is necessary to make the condition for increasing the contribution ratio more strict as compared with lane keeping assist processing which is executed exactly when a user tries to drive the vehicle straightly. Therefore, the consistency-determining section, which determines whether there is consistency greater than or equal to a predetermined value when input to the steering wheel is greater than or equal to the predetermined value, has an especially large utility value as a section that determines whether an execution condition of processing for increasing the contribution ratio is established.

According to one embodiment, the consistency-determining section is configured to input, as a parameter concerning the first steering, at least one of a steering angle by the input operation performed on the steering wheel, a tire angle corresponding to the input operation, and an operation amount corresponding to the input operation, and to determine whether the consistency is greater than or equal to the predetermined value.

The steering angle, the tire angle, and the operation amount corresponding to an input operation are amounts determined in accordance with a user's input operation performed on the steering wheel. On this point, according to this device, if at least one of the steering angle, the tire angle, and the operation amount corresponding to the input operation is used as input for determining whether there is consistency, it is possible to easily and accurately determine steering corresponding to the user's input operation performed on the steering wheel, and to determine whether there is consistency greater than or equal to the predetermined value.

According to one embodiment, the consistency-determining section is configured to input a computation parameter as either one of an intermediate variable generated by the calculating section or the target operation amount, and to determine whether consistency between the first steering and steering that is realized if the contribution ratio is increased is greater than or equal to a predetermined value.

The computation parameter is an appropriate parameter for determining steering which is realized by increasing the contribution ratio of an operation amount calculated by the calculation processing section. Therefore, according to the determination of the consistency-determining section using the computation parameter as input, a condition capable of preventing behavior shown by a vehicle from giving a user a feeling of strangeness by increasing the contribution ratio can be employed as a condition for increasing the contribution ratio.

According to one embodiment, the calculating section is configured to set, as the intermediate variable, a command value of a control amount for making a path of the vehicle match with the target path, and to calculate an operation amount of the actuator to control the control amount to the command value.

According to one embodiment, the control amount includes at least one of a yaw angle of the vehicle, a yaw rate, and speed in a direction perpendicular to a travelling direction of the vehicle in a lane.

Speed in a direction perpendicular to a travelling direction of a vehicle in the yaw angle, the yaw rate, and the lane of the vehicle is an important parameter for controlling the steering of the vehicle. Hence, if the parameter is employed as a control amount, it is possible to appropriately configure the calculation processing section.

According to one embodiment, the consistency-determining section is configured to input, as a parameter concerning the first steering, at least one of a steering angle corresponding to an input operation performed on the steering wheel, a tire angle corresponding to the input operation, and an operation amount corresponding to the input operation, and to determine whether the consistency is greater than or equal to a predetermined value. A dimension of the computation parameter is the same as that of the any one of a command value of the tire angle as the intermediate variable that is input as a parameter concerning the first steering, a command value of a steering angle as the intermediate variable, and the target operation amount.

In the device, an actual value concerning at least one of the steering angle, the tire angle, and the operation amount, and a value calculated by the calculation processing section are used for determining whether there is consistency greater than or equal to the predetermined value. Since the steering angle, the tire angle, and the operation amount are parameters on the output side of the calculation processing section, they are parameters for determining actual action of the actuator, and they are prone to be connected directly to behavior of a vehicle. Hence, in this device, it is possible to accurately determine whether there is consistency greater than or equal to the predetermined value between behavior of the vehicle when the contribution ratio is increased and behavior of the vehicle corresponding to the input operation.

According to one embodiment, the consistency-determining section is configured to determine that the consistency is greater than or equal to the predetermined value, provided that a period is longer than or equal to a predetermined time period, during which period at least one of the following deviation degrees is less than or equal to a predetermined value. A deviation degree when normalization is carried out as necessary to equalize units of magnitude between a command value of a tire angle as the intermediate variable or a command value of a steering angle and a steering angle corresponding to the input operation or a tire angle corresponding to the input operation. A deviation degree between an operation amount corresponding to an input operation performed on the steering wheel and the target operation amount.

In this device, provided that a state where at least one of them is less than or equal to the predetermined value continues, it is determined that there is consistency greater than or equal to the predetermined value. According to this, it is possible to make the above-described determination irrespective of a high order differential value concerning at least one of them.

According to one embodiment, the calculating section includes a feedback control section, the feedback control section includes a history reflecting section for determining output based on a current sampling value concerning a feedback control amount and a predetermined number or more of past sampling values, and a gain-reducing section. When contribution ratio-increasing processing is not yet carried out, the gain-reducing section reduces a gain of processing of determining the output by the history reflecting section as compared with a case where the contribution ratio-increasing processing is carried out. The consistency-determining section is configured to input the computation parameter by the calculating section in a state where gain-reducing processing is carried out by the gain-reducing section, and to determine whether the consistency is greater than or equal to the predetermined value. The computation parameter that is input to the consistency-determining section is a parameter located downstream of the history reflecting section.

To determine an output value, the predetermined history reflection control section can perform control that would not be realized if only the current sampling value were used, based on predetermined number of past sampling values or more in addition to the current sampling value. However, when the contribution ratio is not increased, if a gain of the predetermined history reflection control section remains the same as that when the contribution ratio is increased, there is a concern that the output value time-develops as an inappropriate value since the ratio in which the output value of the predetermined history reflection control section contributes to an operation amount of the actuator is low. Hence, in a case in which the gain remains the same, when the parameter is located downstream of the output value of the predetermined history reflection control section and the computation parameter to which the output value is reflected is used as input of the consistency-determining section, there is a concern that precision of determination whether there is consistency greater than or equal to the predetermined value is deteriorated. On this point, since this device includes the gain lowering processing section, it is possible to reliably prevent the state of concern from generating.

According to one embodiment, the consistency-determining section is configured to input an actual value concerning the corresponding control amount and at least one of a command value of a yaw angle of the vehicle as a command value of the control amount, which is the intermediate variable, a command value of a yaw rate, and a command value of speed in a direction perpendicular to a travelling direction of the vehicle in a lane, and to determine whether the consistency is greater than or equal to the predetermined value.

Steering using the calculation processing section is determined in accordance with the command value of the control amount. On this point, in this device, the calculation processing section inputs a parameter regarded as a control amount. Thus, it is possible to use accurate information concerning behavior of the vehicle when the contribution ratio is increased for determining whether there is consistency greater than or equal to the predetermined value.

According to one embodiment, the contribution ratio-increasing section includes a gradually increasing section. The gradually increasing section increases the contribution ratio by gradually shifting an actual operation amount to an operation amount that is realized by increasing the contribution ratio from an operation amount corresponding to the input operation.

In this device, when the contribution ratio is to be increased, the contribution ratio is not increased in a stepwise manner but is gradually increased by a gradually-increasing processing section. Hence, as compared with a case where the contribution ratio is increased in the stepwise manner, it is possible to more smoothly increase the contribution ratio.

According to one embodiment, the vehicular steering controller further includes an input section through which a user inputs instructions indicating whether the contribution ratio-increasing section is permitted to execute contribution ratio-increasing processing. A condition for permitting the contribution ratio-increasing section to increase the contribution ratio includes a condition that execution permission is input to the input section.

In this device, information indicating that the input section is permitted to execute is input, the contribution ratio is increased. Therefore, it is possible to reliably prevent the contribution ratio from being increased when the user does not desire to do so.

The vehicular steering controller further includes a detecting section for detecting that the execution permission is input to the input section. A condition for permitting the contribution ratio-increasing section to increase the contribution ratio includes a condition that the detecting section detects input of the execution permission after the consistency-determining section determines that the consistency is greater than or equal to the predetermined value.

In this device, to input permission of execution after the consistency-determining section determines there is consistency greater than or equal to the predetermined value is a condition for increasing the contribution ratio. According to this, it is possible for this device to more reliably determine whether the user intends to increase the processing of the contribution ratio, and to execute the increasing processing of the contribution ratio.

The vehicular steering controller further includes a detecting section for detecting that the execution permission is input to the input section and a storing section for storing an input parameter for determining whether the consistency is greater than or equal to the predetermined value. When the detecting section detects input of the execution permission, the consistency-determining section determines whether the consistency is greater than or equal to the predetermined value based on time-series data of the input parameter that is stored in the storing section at a predetermined time period before the input is detected.

In this device, information indicating permission of execution is input to the input section, it is determined whether there is consistency greater than or equal to the predetermined value. Therefore, it is possible to reliably prevent the contribution ratio from being increased when the user does not desire to do so.

The vehicular steering controller further includes a detecting section for detecting that the execution permission is input to the input section. The consistency-determining section determines whether the consistency is greater than or equal to the predetermined value after the detecting section detects input of the execution permission during running of the vehicle.

In this device, provided information meaning permission of execution is input to the input section during running of a vehicle, it is determined whether there is consistency greater than or equal to the predetermined value. Hence, even if information meaning that execution is permitted is input to the input section before the vehicle runs or when the vehicle runs last time, it is not determined whether there is consistency greater than or equal to the predetermined value. Hence, it is possible to reliably prevent the contribution ratio from being increased when a user does not desire to do so.

A condition for permitting the contribution ratio increasing section to increase the contribution ratio includes, in addition to the condition that the consistency-determining section determines that the consistency is greater than or equal to the predetermined value, at least one of (a) a condition that the reliability of recognition of a lane is greater than or equal to a predetermined level, and (b) a condition that at least one of the target operation amount and a tire angle corresponding to the target operation amount has a margin greater than or equal to a predetermined value.

When the reliability of recognition of a lane is low, there is a concern that the reliability of steering by the calculation processing section is lowered. Hence, it is considered steering carried out by an input operation performed on a steering wheel is more preferable. On this point, by employing the (a) as the condition, when the reliability of steering by the calculation processing section is lowered, a high priority can be put on steering carried out by the input operation performed on the steering wheel.

Generally, a control unit is provided with an upper limit, a lower limit and the like, and the calculation processing section also has the same circumstance. An operation amount and a control amount of the actuator are also limited. When a margin with respect to the limit values (upper limit and lower limit) is small, it may be difficult to appropriately perform control by the calculation processing section. On this point, if the (b) is employed as the condition, it is possible to reliably avoid such circumstances.

The calculating section includes a feedback control section. A condition for permitting the contribution ratio increasing section to increase the contribution ratio includes, in addition to the condition that the consistency-determining section determines that the consistency is greater than or equal to the predetermined value, a condition that an absolute value of output of the feedback control section is less than or equal to a predetermined value.

When an output value of the feedback control section is large, there is tendency that stability of control is lowered as compared with a case where the output value is small. In this device, in view of this point, a fact that the absolute value of output of the feedback control section is less than or equal to a predetermined value is included in execution conditions of processing for increasing the contribution ratio. According to this, it becomes easy to stabilize the control by the calculation processing section after the contribution ratio is increased.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

<First Embodiment>

A vehicular steering controller according to a first embodiment will be described below with reference to the drawings.

Figure 1:
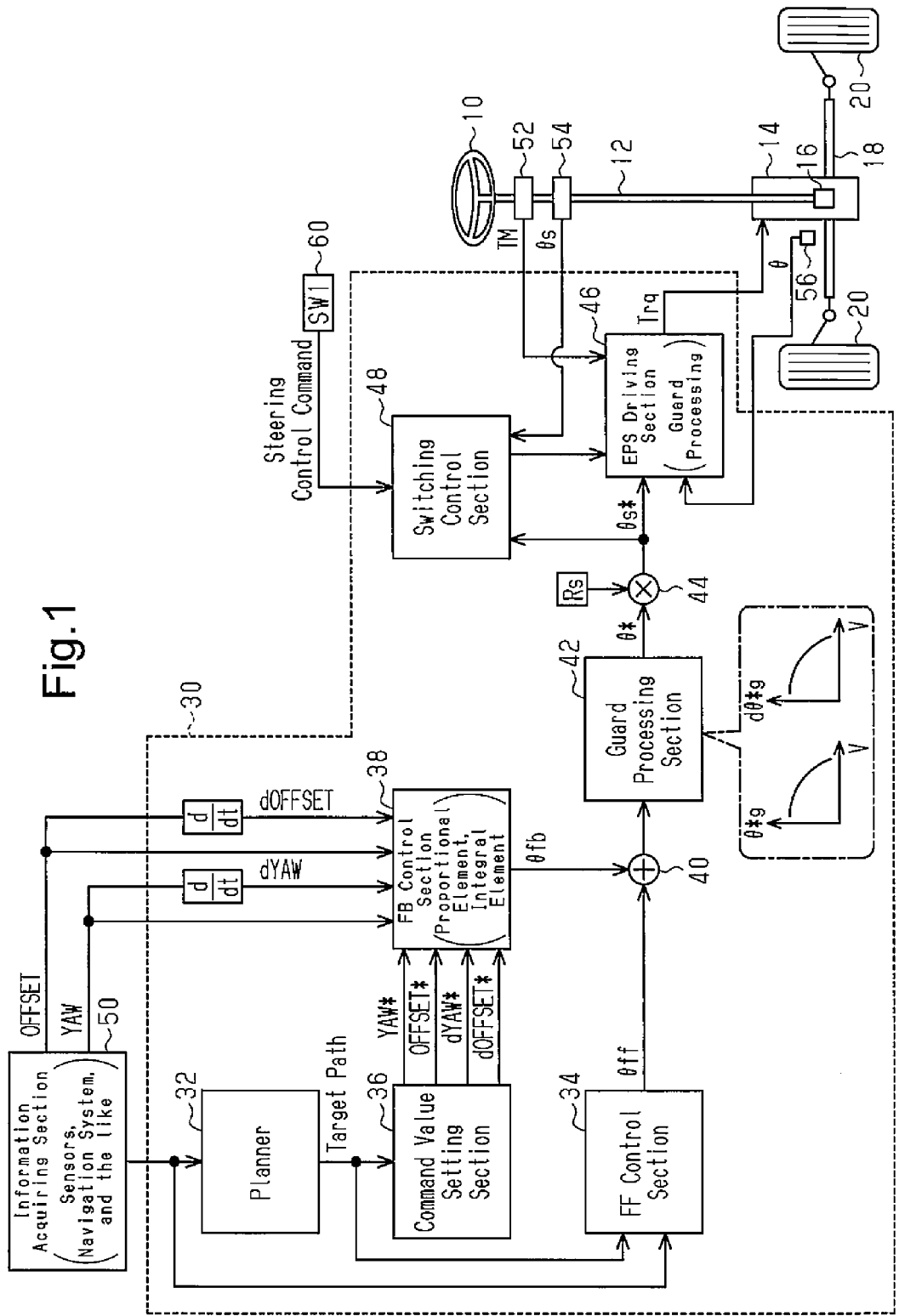
FIG. 1 is a block diagram according to a first embodiment.

FIG. 1 shows a system according to the embodiment.

A steering wheel 10 is mechanically connected to wheels (steered wheels 20) through a rod 12, a pinion 16 and a rack bar 18. The rack bar 18 is connected to an electric power steering wheel 14. The electric power steering wheel 14 is a steering assisting device for assisting an input operation performed on the steering wheel 10. The electric power steering wheel 14 is also an actuator for setting a tire angle $\theta$ as a control amount and for steering-controlling the control amount irrespective of whether there is an input operation performed on the steering wheel 10. The tire angle $\theta$ is an angle formed between a plane having axes of the steered wheels 20 as normal lines and a predetermined direction determined by arbitrary two points of a vehicle. In this embodiment, the predetermined direction is a longitudinal direction of the vehicle.

The control device 30 has a function to execute the steering control instead of an input operation performed on the steering wheel 10 by outputting, to the electric power steering wheel 14, steering torque Trq as an operation amount for controlling the tire angle $\theta$. The steering torque Trq is an operation amount of an actuator for realizing the tire angle $\theta$, which is a control amount when steering is controlled, and is torque for realizing the tire angle $\theta$. Next, steering control will be described.

Information is input from an information acquiring section 50 to a control device 30. The information acquiring section 50 includes sensors such as a radar unit, a camera, and a navigation system. Information that is input from the information acquiring section 50 is input to a planner 32 of the control device 30.

The planner 32 generates a target path of the vehicle based on the input information. In this embodiment, the planner 32 recognizes a road marking line such as a white line that comparts a lane based on an image shot by the camera. The planner 32 receives reflected waves of radar irradiation, and recognizes a vehicle in front based on the received reflected waves. The planner 32 identifies a lane on which a user's vehicle runs based on the recognized road marking line, and generates a target path. In this embodiment, the producing processing of the target path is processing of producing loci drawn by a typical point (such as gravity center) of the vehicle when the vehicle runs, and of producing a path existing along the running loci as a target path. When the typical point is located at a central portion in a lateral direction of the vehicle, the running loci may be an aggregate of central points of a pair of road marking lines, i.e., a central line. Instead of this, the running loci may be a spline curve or a clothoid curve based on several points designated in a region where typical points can be selected.

The control device 30 calculates steering torque Trq which is an operation amount of the electric power steering wheel 14 based on the generated target path.

That is, a feedforward control section 34 calculates a feedforward amount $\theta$ff concerning the tire angle $\theta$ for running on the target path by open loop control based on target path information from the planner 32 and running speed (vehicle speed V) of the vehicle, which is input from an information acquiring section 50. For example, curvature of a curve drawn by the typical point when the vehicle runs is determined from the target path information, and the tire angle $\theta$ with which steady-state cornering most fitting the curvature can be carried out may be determined as the feedforward amount $\theta$ff.

Figure 2:
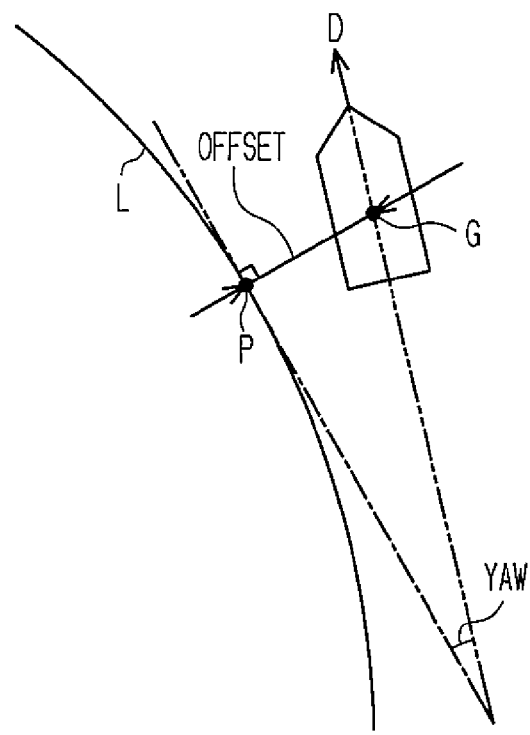
FIG. 2 is a diagram showing a yaw angle and offset according to the first embodiment.

A command value setting section 36 sets a command value concerning a control amount for making a path of the vehicle match with the target path and concerning a control amount in which the tier angle $\theta$ is regarded as an operation amount. A yaw angle YAW and a lateral direction position OFFSET shown in FIG. 2 are included in this control amount. That is, the yaw angle YAW is a parameter showing an angle formed between a travelling direction D of the vehicle and a direction of a lane comparted by the road marking line. In this embodiment, the yaw angle YAW is an angle formed between a tangent (dashed line) of a road marking line L at a point P and a travelling direction D of the vehicle. The point P is an intersection point between the road marking line L and a perpendicular line from a gravity center G of the vehicle, i.e., the road marking line L in the gravity center G of the vehicle. The lateral direction position OFFSET is a parameter showing a distance between the road marking line and the vehicle. In this embodiment, the lateral direction position OFFSET is a distance between the gravity center G and the point P.

The control amount by the command value setting section 36 includes a yaw rate dYAW, which is the rate of change of the yaw angle YAW and lateral direction speed dOFFSET which is the rate of change of the lateral direction position OFFSET in addition to the yaw angle YAW and the lateral direction position OFFSET. Therefore, the command value setting section 36 sets a yaw angle command value YAW*, a lateral direction position command value OFFSET*, a yaw rate command value dYAW* and a lateral direction speed command value dOFFSET*. The yaw angle command value YAW*, the lateral direction position command value OFFSET*, the yaw rate command value dYAW* and the lateral direction speed command value dOFFSET* are variably set based on the target path.

A feedback control section 38 calculates a feedback amount θfb. The feedback amount θfb is an operation amount for feedback controlling, for the above-described command values, the yaw angle YAW and the lateral direction position OFFSET as feedback control amounts which are output from the information acquiring section 50, and the yaw rate dYAW and the lateral direction speed dOFFSET calculated from the yaw angle YAW and the lateral direction position OFFSET. The feedback amount θfb is an amount concerning the tire angle θ. In this embodiment, especially the feedback control section 38 includes a proportional element and an integral element. Here, it is not always true that both the proportional element and the integral element are allocated to each of the four control amounts. For example, only the difference between the lateral direction position OFFSET and the lateral direction position command value OFFSET* may become input of the proportional element and the integral element, and differences between the remaining control amounts and their command values may be input of the proportional element. The feedback amount θfb may be the sum of an output value of the proportional element and an output value of the integral element.

A two-degree-of-freedom adding section 40 outputs a value obtained by adding the feedforward amount Off and the feedback amount θfb. A guard processing section 42 outputs, as a tire angle command value θ*, a value obtained by subjecting an output value of the two-degree-of-freedom adding section 40 to guard processing. The magnitude of an output value of the two-degree-of-freedom adding section 40 and the magnitude of its rate of change are subjected to the guard processing. In FIG. 1, a guard value θ*g with respect to the magnitude of the output value and a guard value dθ*g with respect to the magnitude of the rate of change are shown as examples. As vehicle speed V is greater, the guard values θ*g and dθ*g are set to smaller values. When the magnitude of the output value of the two-degree-of-freedom adding section 40 is greater than the guard value θ*g or when the magnitude of the rate of change of the output value is greater than the guard value dθ*g, the output value of the two-degree-of-freedom adding section 40 is different from the tire angle command value θ*.

A converting section 44 converts the tire angle command value θ* into a steering angle command value θs* by multiplying the tire angle command value θ* by a steering wheel gear ratio Rs. The steering angle command value θs* is a steering angle θs of the steering wheel 10 when the actual tire angle θ is equal to the tire angle command value θ*. The steering angle command value θs* is input to an EPS driving section 46. When the steering control is executed, the control amount is the tier angle θ detected by a rotation angle sensor 56, and steering torque Trq is an operation amount for controlling the detected tire angle θ to a tire angle (tire angle command value θ*) that corresponds to the steering angle command value θs*. The EPS driving section 46 calculates the steering torque Trq, and outputs the calculated steering torque Trq to the electric power steering wheel 14. According to this, the electric power steering wheel 14 controls torque generated by a built-in motor (not shown) to the steering torque Trq. The rotation angle sensor 56 may be a sensor that detects a rotation angle of a rotation shaft of the motor.

The steering torque Trq is also an operation amount for controlling the yaw angle YAW, the lateral direction position OFFSET, the yaw rate dYAW and the lateral direction speed dOFFSET as control amounts to the command values thereof. In this case, it is considered that the tire angle command value θ* is an intermediate variable. It is also considered that the yaw angle command value YAW*, the lateral direction position command value OFFSET*, the yaw rate command value dYAW* and the lateral direction speed command value dOFFSET* in addition to the tire angle command value θ* are intermediate variables for calculating an operation amount of the electric power steering wheel 14 for running on a target path.

When the steering control is not executed, the EPS driving section 46 assists the tire angle θ to displace by user's operation of the steering wheel 10. The assisting processing is executed based on an output value of a torque sensor 52. The torque sensor 52 detects torque (steering wheel torque TM) applied to the rod 12 by operation performed on the steering wheel 10. In the assisting processing, assisting torque is output to the electric power steering wheel 14 as steering torque Trq. In this case, the tire angle θ is realized by torque input to the steering wheel 10 and assisting torque. That is, an operation amount when the tire angle θ is regarded as a control amount is determined by the input torque and the assisting torque.

A switching control section 48 executes switching control between the steering control and switching control of steering. A user can input instructions that the steering control should be executed or not through a steering control switch 60. The switching control section 48 takes in a signal corresponding to an operation state of the steering control switch 60.

Figure 3:
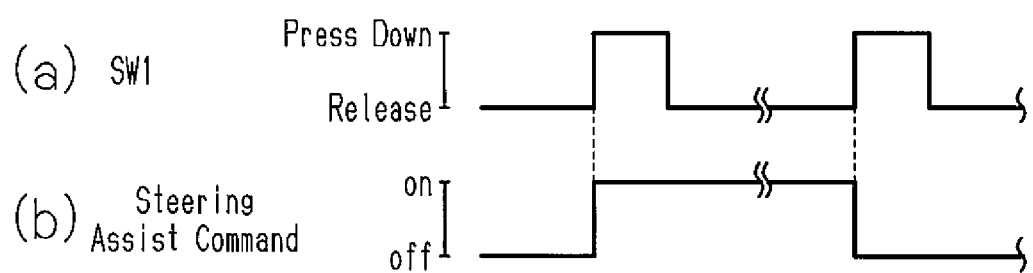
FIG. 3 is a time chart showing characteristics of a steering control switch according to the first embodiment.

FIG. 3 shows characteristics of the steering control switch 60 according to the embodiment. More specifically, FIG. 3(a) shows changes of operation performed on the steering control switch 60, and FIG. 3(b) shows changes concerning a state whether a steering control command is output or not. As shown in FIG. 3, in this embodiment, either one of a state where the steering control command is output or a state where this command is not output is held through a period which starts after the steering control switch 60 is pressed down and which is expired when the steering control switch 60 is again pressed down. This can be realized by using the steering control switch 60 which returns to its initial state if it is pressed down twice.

When such a steering control switch 60 is used, if the steering control switch 60 is pressed down before the vehicle runs and the steering control command is to be output, it is possible to switch control to the steering control without pressing down the steering control switch 60 again. To prevent a user from experiencing a feeling of strangeness because of the switching operation, the switching control section 48 inputs the steering angle command value θs* and the steering angle θs to execute the steering control. This will be described based on FIG. 4.

Figure 4:
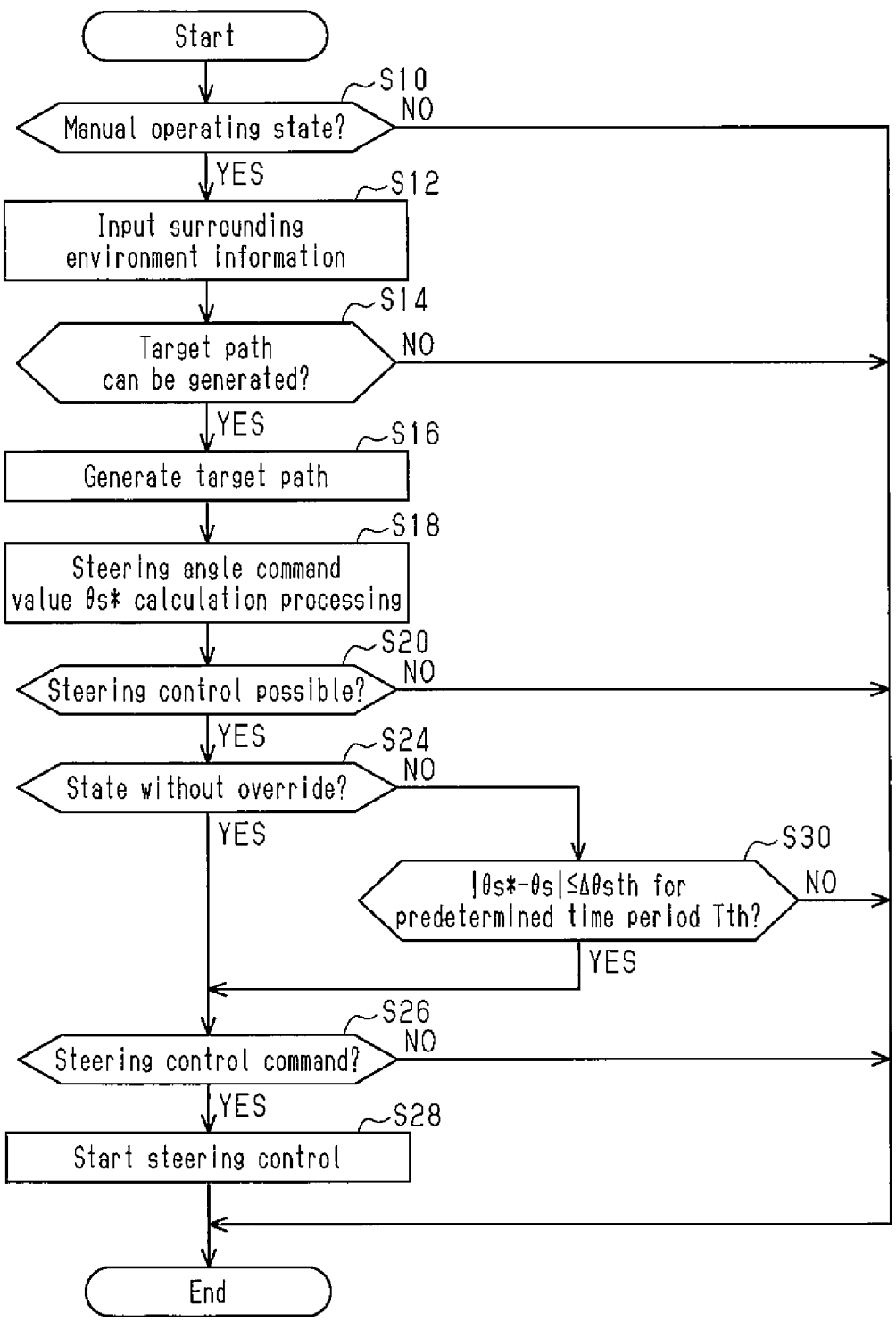
FIG. 4 is a flowchart showing procedure of steering control starting processing according to the first embodiment.

FIG. 4 shows a procedure of starting processing of the steering control. The processing shown in FIG. 4 is repeatedly executed at predetermined intervals, for example.

In the series of processing shown in FIG. 4, the control device 30 determines whether the current state is a manual operating state in which an input operation performed on the steering wheel 10 is assisted by the electric power steering wheel 14 (S10). When a positive determination is made in step S10, the control device 30 inputs, to the planner 32, surrounding environment information that is output from the information acquiring section 50 (S12). The planner 32 determines whether it is possible to plan a path based on the acquired information, i.e., whether a target path can be generated (S14). A case where it is not possible to produce a target path is a case where the planner 32 cannot recognize a road marking line or a case where a position of the user's vehicle cannot be determined.

If the planner 32 determines that a target path can be generated (S14: YES), the planner 32 generates the target path (S16). Subsequently, the planner 32 calculates the steering angle command value $\theta s^*$ (S18). Here, the steering angle command value $\theta s^*$ is calculated in accordance with the block diagram shown in FIG. 1.

Next, the control device 30 determines whether it is possible to execute the steering control (S20). In this embodiment, when an output value and its rate of change of the two-degree-of-freedom adding section 40 shown in FIG. 1 exceed a guard value of the guard processing section 42, it is determined that the control device 30 cannot execute the steering control. This is because if the output value and the rate of change exceed the guard value, since an output value of two-degree-of-freedom control and the tire angle command value $\theta^*$ are different from each other, there is a concern that it is difficult to control a path to a target path.

If the control device 30 determines that it is possible to execute the steering control (S20: YES), the control device 30 determines whether torque input to the steering wheel 10 by a user is less than or equal to a predetermined torque value (hereinafter, this is called state where there is no override in some cases) (S24). In this processing, it is determined whether a user tries to drive his or her vehicle straightly. If the control device 30 determines that the current state is the state where there is no override (S24: YES), the control device 30 determines whether the steering control command is output (S26). If the control device 30 determines that the current state is the state where the steering control command is output (S26: YES), the control device 30 starts the steering control (S28). That is, the EPS driving section 46 calculates the steering torque Trq based on the steering angle command value $\theta s^*$, and outputs the calculated steering torque Trq to the electric power steering wheel 14. According to this, the electric power steering wheel 14 controls drive current of the built-in motor based on the steering torque Trq, and makes torque of the built-in motor match with the steering torque Trq. According to this, the tire angle $\theta$ is controlled to the tire angle command value $\theta^*$.

If the switching control section 48 determines that the current state is a state where torque input to the steering wheel 10 by a user is greater than or equal to the predetermined torque (hereinafter, this is called state where there is override in some cases) (S24: NO), it is determined whether a state where the absolute value of the difference between the steering angle command value $\theta s^*$ and the steering angle $\theta s$ is less than or equal to a threshold value $\Delta\theta sth$ continues for a predetermined time period Tth or longer (S30). In the processing, it is determined whether there is consistency greater than or equal to the predetermined value between steering carried out by the steering control and steering carried out by an input operation performed on the steering wheel 10. When the deviation degree between the steering angle command value $\theta s^*$ calculated by the processing shown in FIG. 1 and the steering angle $\theta s$ is small, it can be determined that steering carried out by the steering control realized by the processing shown in FIG. 1 is consistent with the input operation performed on the steering wheel 10. This is because since the steering angle $\theta s$ is a value determined by the user's input operation performed on the steering wheel 10, a user's intention of steering is reflected in the steering angle $\theta s$. Therefore, when the deviation degree between the steering angle command value $\theta s^*$ calculated by the processing shown in FIG. 1 and the steering angle $\theta s$ is small, it can be determined that steering carried out by the steering control realized by the processing shown in FIG. 1 is consistent with the user's intention. A reason why the steering angle command value $\theta s^*$ is employed as the input to the switching control section 48 instead of the tire angle command value $\theta^*$ is that to appropriately determine the deviation degree with respect to the steering angle $\theta s$, a parameter converted (subjected to normalization processing) into an amount which can be compared with the steering angle $\theta s$ in magnitude.

When a positive determination is made in step S30, the control device 30 determines that there is consistency greater than or equal to the predetermined value between steering carried out by the steering control and steering carried out by the input operation performed on the steering wheel 10, and the processing is shifted to step S26. According to this, if the steering control command is output (S26: YES), the control device 30 starts the steering control (S28). When the steering control is to be started, it is preferable that a user is informed to that effect. This can be realized by turning on a lamp that shows whether the steering control is executed.

Operation of this embodiment will be described using FIG. 5.

Figure 5:
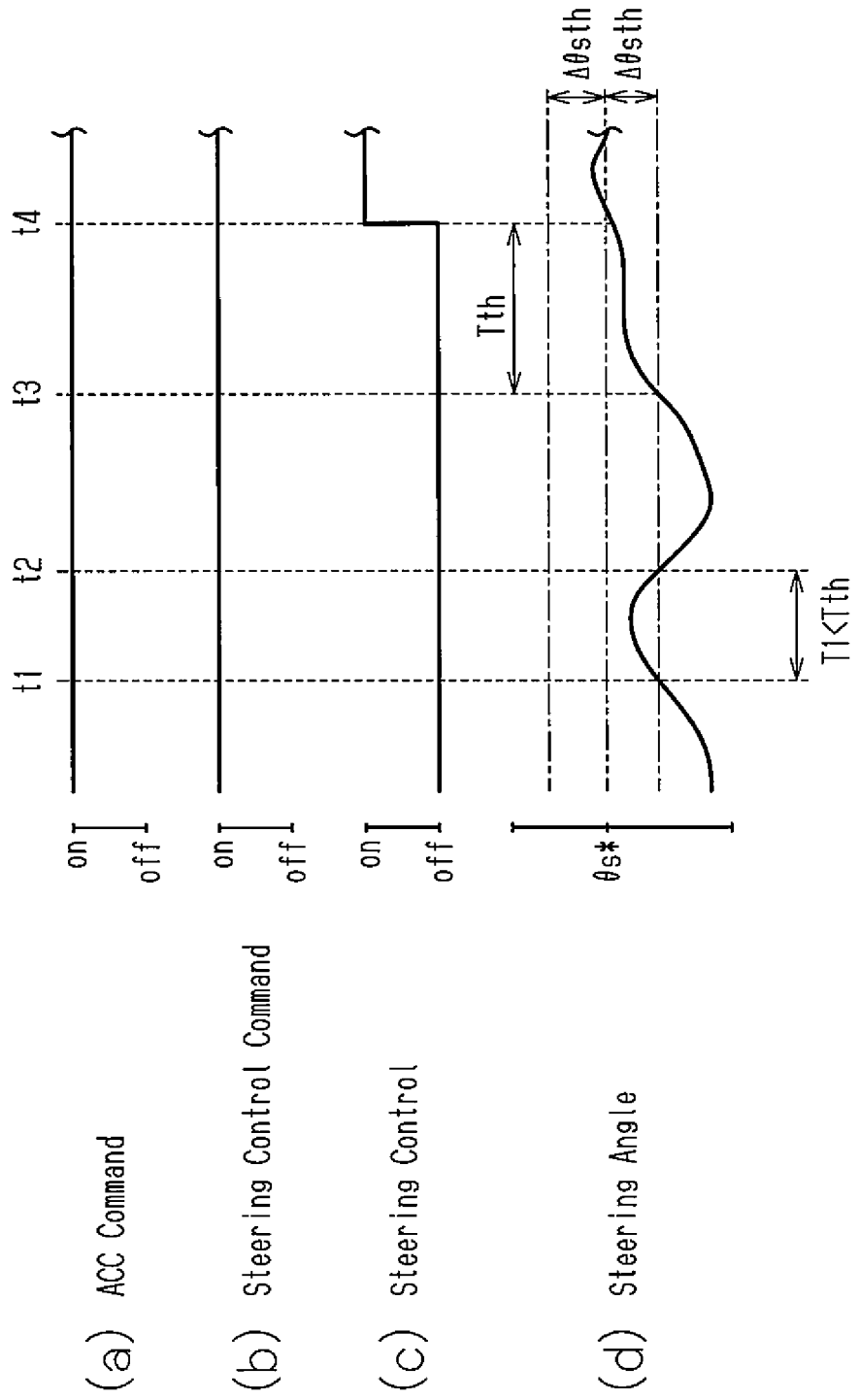
FIG. 5 is a time chart showing one example of the steering control starting processing according to the first embodiment.

In FIG. 5, (a) shows changes of ACC command, (b) shows changes of steering control command, (c) shows changes of presence or absence of execution of steering control, and (d) shows changes of steering angle $\theta s$.

In an example shown in FIG. 5, although the absolute value of the difference between the steering angle command value $\theta s^*$ and the steering angle $\theta s$ is less than or equal to the threshold value $\Delta\theta sth$ at a point in time t1, this state disappears at a point in time t2. Since a time period T1 (T1 =t2−t2) during this is shorter than the predetermined time period Tth, steering control is not started. On the other hand, if the absolute value of the difference between the steering angle command value $\theta s^*$ and the steering angle $\theta s$ is less than or equal to the threshold value $\Delta\theta sth$ at a point in time t3 and this state continues for the predetermined time period Tth (at a point in time t4), the steering control is started. Before the steering control is started, the steering angle command value $\theta s^*$ does not contribute, at all, to the operation amount (steering torque) for realizing the tire angle $\theta$. Hence, the contribution ratio is zero. On the other hand, if the steering control is started, the operation amount for realizing the tire angle $\theta$ becomes an operation amount for realizing the steering angle command value $\theta s^*$. Incidentally, if the control is switched to the steering control, it is possible to realize a desired steering angle $\theta s$ even if a user does not add torque to the steering wheel 10. That is, there is a possibility that the contribution ratio that is necessary that an input operation performed on the steering wheel 10 realizes a tire angle $\theta$ is reduced to zero.

When the steering control is started, the steering control is continued until circumstances such as that the lane is changed or the steering angle is largely changed by an input operation performed on the steering wheel 10 is generated. Determination to stop the steering control caused by changing of the steering angle largely may be made based on the difference between the steering angle command value $\theta s^*$ and the steering angle $\theta s$. In this case, it is preferable that a threshold value with respect to the absolute value of the difference therebetween is set to a larger value than the threshold value $\Delta\theta sth$.

According to the above-described embodiment, the following advantages are obtained.

(1) Provided that there is consistency greater than or equal to the predetermined value between steering carried out by steering control and steering carried out by an input operation performed on the steering wheel 10, the steering control is executed. According to this, since it is possible to switch control to the steering control, it is possible to reliably prevent behavior of a vehicle from giving a user a feeling of strangeness.

(2) When torque input to the steering wheel 10 is greater than or equal to the predetermined torque value, if there is consistency greater than or equal to the predetermined value between steering carried out by an input operation performed on the steering wheel 10 and steering carried out by the steering control, control is switched to the steering control (step S24 in FIG. 4: NO). In a state where the input torque is greater than or equal to the predetermined torque value, if a user changes the input torque, the travelling direction is changed, and there is a possibility that variation in the direction of the vehicle with respect to the variation in the input torque may be delayed. On the other hand, exactly when torque input to the steering wheel 10 is less than the predetermined torque value, if control is switched to the steering control, the direction of a vehicle is not changed when the control is switched to the steering control. Hence, as compared with steering control that is executed when a user tries to drive the vehicle straightly, to prevent behavior of the vehicle from giving the user a feeling of strangeness when the control is switched to the steering control, it is considered that it is necessary to more carefully switch the control to the steering control. Hence, a utility value of determination whether there is consistency greater than or equal to the predetermined value is especially large.

(3) A target path is input and based on an intermediate variable for calculating steering torque Trq, it is determined whether steering carried out by an input operation performed on the steering wheel 10 and steering carried out by the steering control have consistency greater than or equal to the predetermined value. The intermediate variable is not uniquely determined by a target path, and is a parameter located downstream of the target path in a calculating processing process of the steering torque Trq. Hence, the intermediate variable is a parameter capable of accurately determining steering carried out by the steering control as compared with the target path. Therefore, if the intermediate variable is used, it is possible to more appropriately determine whether there is consistency greater than or equal to the predetermined value. The expression that a parameter A is located downstream of a parameter B means that B or a value calculated using B is used for calculating A.

(4) Based on the steering angle θs directly showing a user's input operation performed on the steering wheel 10 and the corresponding steering angle command value θs*, it is determined whether steering carried out by the input operation performed on the steering wheel 10 and the steering carried out by the steering control has consistency greater than or equal to the predetermined value (step S30 in FIG. 4). Hence, it is possible to accurately determine whether there is consistency greater than or equal to the predetermined value.

(5) Based on the steering angle command value θs* and the steering angle θs, it is determined whether the steering carried out by the input operation performed on the steering wheel 10 and the steering carried out by the steering control has consistency greater than or equal to the predetermined value (step S30 in FIG. 4). According to this, as compared with a case where it is determined whether there is consistency greater than or equal to the predetermined value based on the deviation degree between a control amount and its command value of the feedback control section 38, it is easy to increase the frequency at which it is determined that there is consistency greater than or equal to the predetermined value without deteriorating precision of determination, and it is easy to increase the execution frequency of the steering control. This is because the difference between the control amount and the command value of the feedback control section 38 is a multidimensional amount but the steering angle command value θs* is a one-dimensional amount, and the feedforward amount Off contributes to the steering angle command value θs* and thus, the difference between the control amount and the command value and the steering angle command value θs* do not have a one-to-one correspondence.

Using a simple example, a reason why it is easy to increase the execution frequency of the steering control by determining whether there is consistency greater than or equal to the predetermined value between the steering carried out by the input operation performed on the steering wheel 10 and the steering carried out by the steering control will be described based on the steering angle command value θs* and the steering angle θs. Assume that the lateral direction position OFFSET and the lateral direction position command value OFFSET* match with each other, the lateral direction speed dOFFSET and the lateral direction speed command value dOFFSET* match with each other, and the steering angle θs and a value obtained by multiplying the feedforward amount Off by the steering wheel gear ratio Rs match with each other. Further, assume that both a difference Δ1 between the yaw angle YAW and the yaw angle command value YAW* and a difference Δ2 between the yaw rate dYAW and the yaw rate command value dYAW* are values that bring the feedback amount θfb into a positive value, and a difference Δ3 between the steering angle command value θs* and the steering angle θs matches with the threshold value Δθsth. In this case, it is considered that the determination processing is executed by setting a threshold value for determining whether there is consistency greater than or equal to the predetermined value between the difference between the yaw angle YAW and the yaw angle command value YAW* and the difference between the yaw rate dYAW and the yaw rate command value dYAW* to a value less than or equal to |Δ1|, |Δ2|. In this case, it is not determined that there is consistency except that it is determined that there is consistency in the processing in step S30. However, when the difference between the yaw rate dYAW and the yaw rate command value dYAW* becomes zero, even if the absolute value of the difference between yaw angle YAW and the yaw angle command value YAW* is larger than |Δ1|, there is a possibility that it is determined that there is consistency greater than or equal to the predetermined value in step S30. On the other hand, if the threshold value is set to |Δ1|, |Δ2|, it is determined that there is no consistency. From the above reason, when the difference between the steering angle command value θs* and the steering angle θs is used, as compared with a case where the control amount and the command value are used, it is easy to increase the frequency at which it is determined that there is consistency greater than or equal to the predetermined value when precision when it is determined that there is consistency greater than or equal to the predetermined value remains the same.

(6) If the absolute value of the difference between the steering angle command value θs* and the steering angle θs is less than or equal to the threshold value Δθsth continued for the predetermined time period Tth or longer, it is determined that there is consistency greater than or equal to the predetermined value. By determining that there is consistency greater than or equal to the predetermined value based on continuation, it is possible to easily quantify changes of the steering angle θs, and to determine a user's intention without depending upon high order differential value of the steering angle θs.

(7) A fact that a steering control command is output is added to start-execution conditions of steering control. According to this, when it is not desired to start the steering control, it is possible to reliably prevent steering control from being carried out.

(8) A fact that an output value and its rate of change of the two-degree-of-freedom adding section 40 are not subjected to the guard processing is added to the execution conditions of steering control (step S20 in FIG. 4). According to this, when an output value of the two-degree-of-freedom adding section 40 that is calculated as an appropriate value for making a path of a vehicle match with a target path is not directly employed, steering control is not carried out and thus, it is possible to reliably prevent the steering control from being started when control is not appropriately carried out.

(9) The steering control switch 60 is set such that if an operation for outputting the steering control command is once carried out, a state where the steering control command is output is maintained unless an operation is again carried out. According to this, when the user steers the vehicle, it is possible to switch the control to the steering control without requiring a special operation that is different from the driving operation of the user. In this case, however, it is especially desired that behavior of a vehicle is prevented from giving the user a feeling of strangeness when the control is switched to the steering control. Hence, a condition that there is consistency greater than or equal to the predetermined value between steering carried out by an input operation performed on the steering wheel 10 and steering carried out by steering control has an especially high value as an execution condition of steering control.

<Second Embodiment>

A second embodiment will be described below with reference to the drawings with a focus on differences from the first embodiment.

In this embodiment, during manual driving, the integral element is stopped. Further, in this embodiment, the reliability of steering control when steering control is executed is previously evaluated, and when the reliability of the steering control is low, the steering control is not executed.

Figure 6:
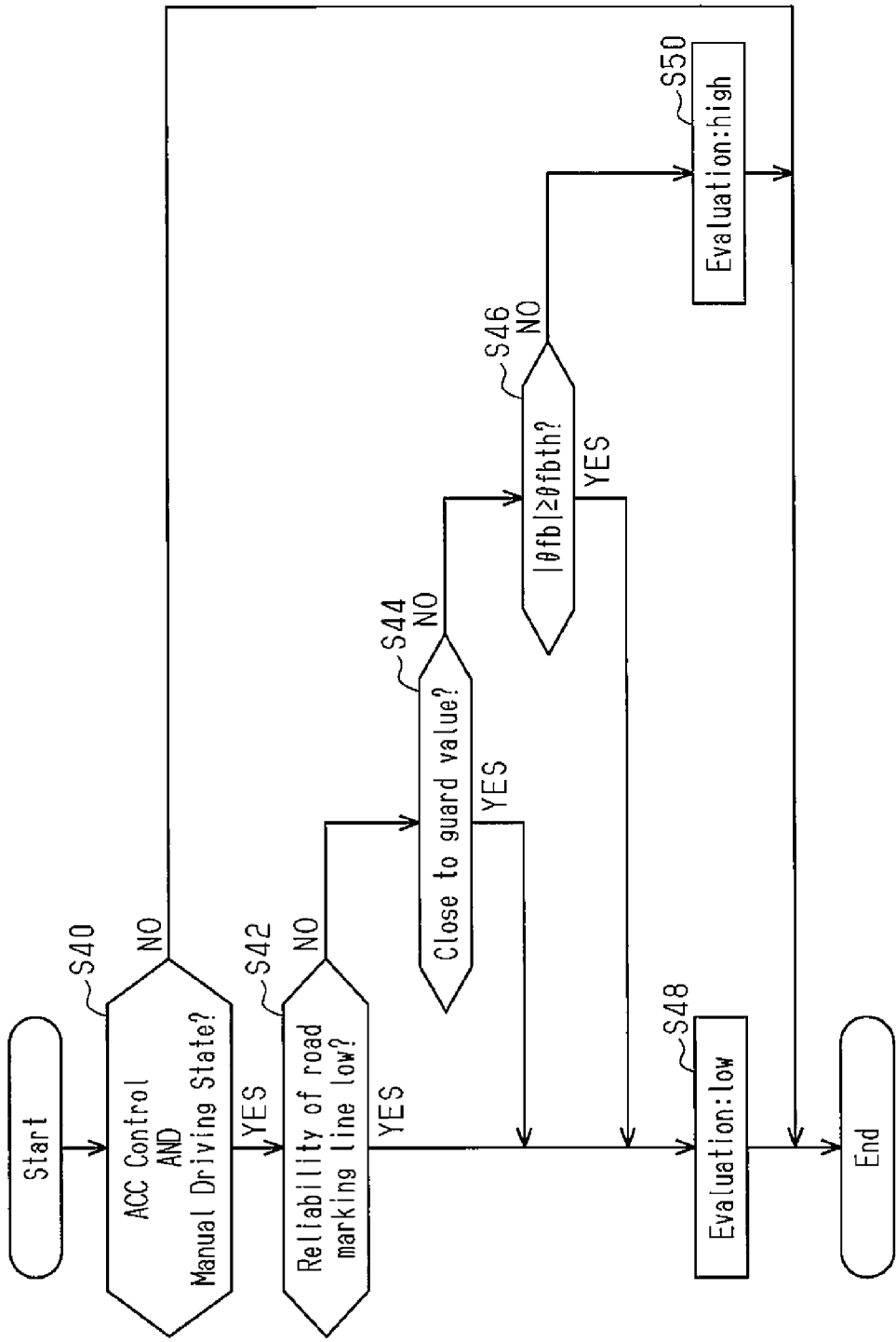
FIG. 6 is a flowchart showing procedure of evaluating processing of steering control according to a second embodiment.

FIG. 6 shows a procedure of evaluating processing of the reliability of the steering control. The processing shown in FIG. 6 is repeatedly executed by a control device 30 at predetermined intervals, for example.

In a series of processing shown in FIG. 6, a control device 30 first determines whether the current state is a manual driving state (S40). This processing is provided for evaluating the reliability of the steering control before manual driving is switched to the steering control. When a positive determination is made in step S40, the control device 30 evaluates the reliability of steering control when it is assumed that the steering control is started.

That is, when the reliability of a recognized road marking line L such as a white line is low (S42: YES), the control device 30 evaluates that the reliability is low (S48). The reliability of the recognized road marking line L may be quantified by a known method.

When the difference between a guard value determined by a guard processing section 42 and at least one of an output value of a two-degree-of-freedom adding section 40 and the rate of change of the output value is less than or equal to a predetermined value (S44: YES), the control device 30 evaluates that reliability of steering control is low (S48). This is because if the output value and its rate of change of the two-degree-of-freedom adding section 40 exceed the guard value by starting the steering control, since control as required cannot be performed, it is considered that the reliability of steering control is deteriorated. When the absolute value of a feedback amount θfb is greater than or equal to a threshold value θfbth (S46: YES), the control device 30 evaluates that the reliability of steering control is low (S48). This is because when a feedback amount θfb is large, there is a concern that control is destabilized.

When a negative determination is made in all of steps S42 to S46, the control device 30 determines that the reliability of steering control is high (S50). When processing of steps S48 and S50 is completed or when a negative determination is made in step S40, the control device 30 temporarily suspends the series of processing.

Figure 7:
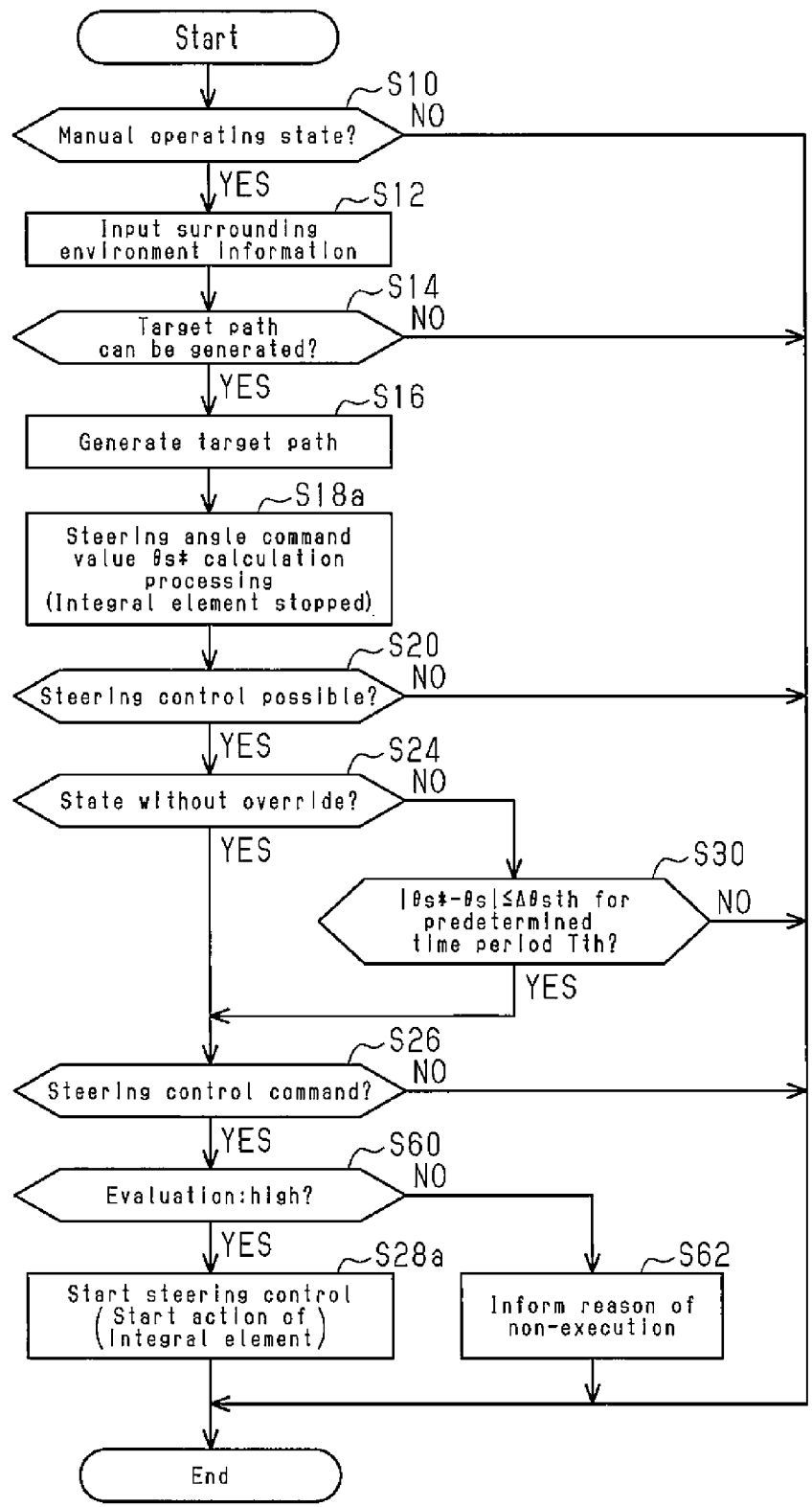
FIG. 7 is a flowchart showing procedure of a steering control starting processing according to the second embodiment.

FIG. 7 shows a procedure of starting processing of steering control of the second embodiment. The processing shown in FIG. 7 is repeatedly executed by the control device 30 at predetermined intervals, for example. In the processing shown in FIG. 7, the same step numbers are allocated to processing corresponding to that shown in FIG. 4 for convenience sake.

In series of processing shown in FIG. 7, when processing in step S16 is completed, the control device 30 executes processing of calculating a steering angle command value θs* (S18a). In step S18a, however, an integral element of the feedback control section 38 is stopped. This is because a tire angle command value θ* having a one-to-one correspondence with the steering angle command value θs* is not reflected in an actual tire angle θ. That is, by successively aggregating the difference between a control amount, which is input and a command value, the integral element resolves the steady difference, but if its output value is not reflected in the actual tire angle θ, there is a concern that inconvenience such at that the absolute value excessively becomes large.

When a positive determination is made in processing in step S26, the control device 30 determines whether an evaluation result of steering control by the processing shown in FIG. 6 is high (S60). If the control device 30 determines that the evaluation result is high (S60: YES), the control device 30 starts the steering control (S28a). In step S28a, as the steering control is started, action of an integral element of the feedback control section 38 is started.

When the control device 30 determines that the evaluation result is low (S60: NO) on the other hand, the control device 30 does not execute the steering control, the control device 30 informs the user to that effect (S62), and temporarily suspends this series of processing. For example, attention should be given to the user by applying to the steering wheel 10 a very small reaction force or very small vibration acting against a force applied by a user. It is also possible to inform the user by means of visual information or sound information. When visual information or sound information is used, it is also possible to inform the user of a reason why steering control is not executed. For example, when the reliability of a road marking line is low, the user should be informed to that effect. Further, the notification of the reason can be a guidance notification informing the user that the steering control can be executed if this reason is resolved. More specifically, when a positive determination is made in step S44 in FIG. 6 and the steering control is not executed, it is possible to inform the user that the steering control can be carried out by bringing the vehicle close to a central location of a lane.

According to the above-described second embodiment, the following advantages are obtained in addition to the advantage of the first embodiment.

(10) The reliability of steering control can be improved by adding the fact that the reliability of a road marking line L is high to the execution conditions of the steering control.

(11) A fact that the difference between an output value and its rate of change of the two-degree-of-freedom adding section 40 and a guard value is greater than or equal to the predetermined value is added to the execution conditions of the steering control. According to this, it is possible to improve the reliability of steering control.

(12) A fact that the absolute value of the feedback amount θfb is less than or equal to the predetermined value is added to the execution conditions of the steering control. According to this, it is possible to improve the reliability of steering control.

(13) When it is determined whether steering control should be executed, an integral element of the feedback control section 38 is stopped (step S18a in FIG. 7). According to this, it is possible to avoid a case where it is determined that the steering carried out by an input operation performed on the steering wheel 10 and the steering carried out by the steering control are not consistent with each other only because the absolute value of the steering angle command value θs* diverges due to the fact that an output value of the integral element is not reflected in actual control.

<Third Embodiment>

A third embodiment will be described below with reference to the drawings with a focus on differences from the first embodiment.

In the third embodiment, when steering control is started, a contribution ratio corresponding to an input operation performed on a steering wheel 10 with respect to steering torque Trq is gradually reduced, and the contribution ratio corresponding to a steering angle command value θs* is gradually increased.

Figure 8:
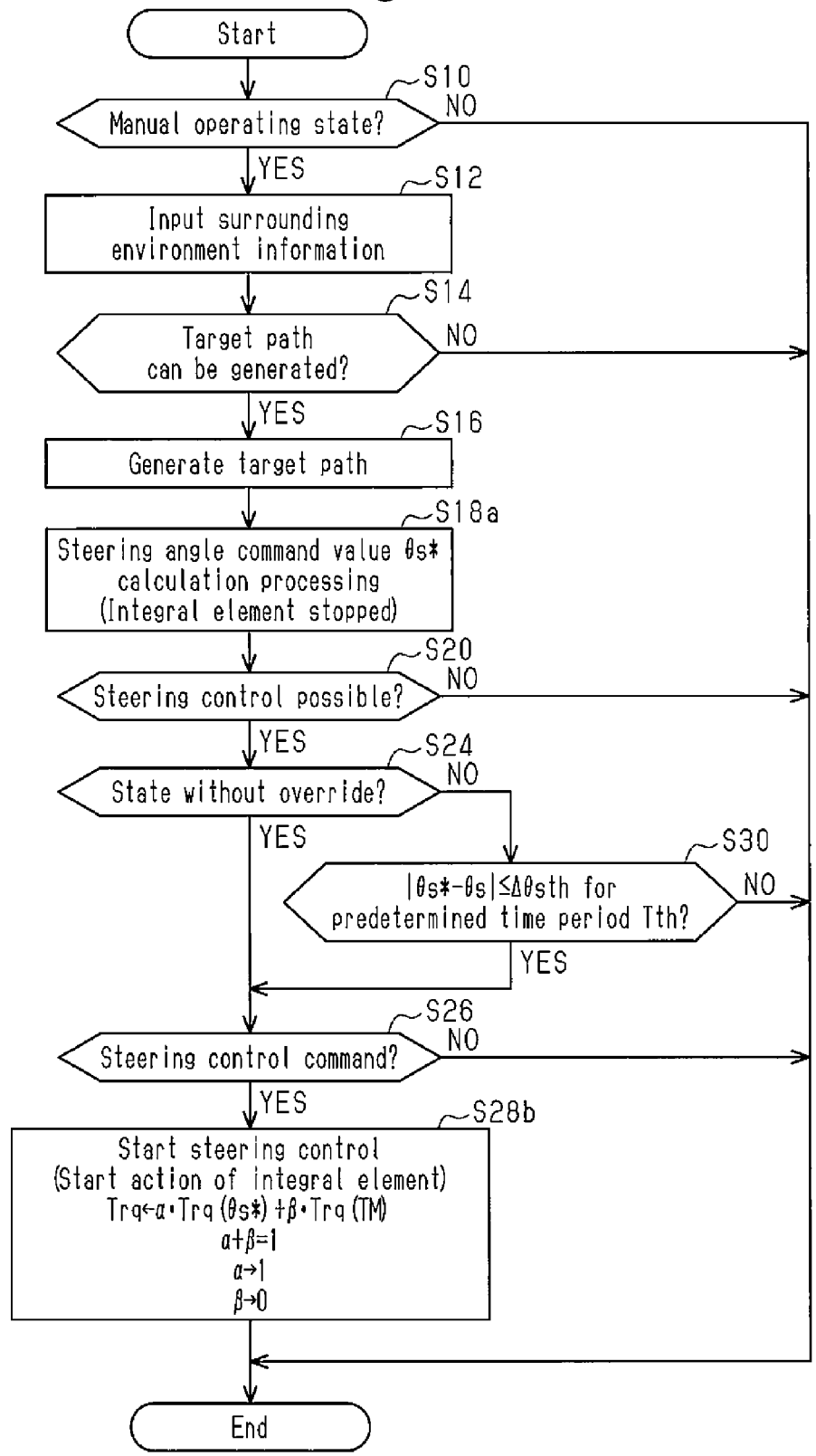
FIG. 8 is a flowchart showing procedure of steering control starting processing according to a third embodiment.

FIG. 8 shows a procedure of starting processing of steering control according to the third embodiment. This processing is repeatedly executed by a control device 30 at predetermined intervals, for example. In the processing shown in FIG. 8, the same step numbers are allocated to processing corresponding to that shown in FIG. 4 for convenience sake.

In this series of processing, when a positive determination is made in step S26, the control device 30 starts steering control (S28b). Here, using weight coefficients α and β, steering torque Trq is calculated as α·Trq (θs*)+β·Trq (TM). The Trq(θs*) is steering torque determined in accordance with steering angle command value θs*, and Trq (TM) is assisting torque generated in an electric power steering wheel 14 when processing in step S28b is started.

The weight coefficients α and β are standardized such that the sum thereof is 1. While satisfying this standardization, the weight coefficient α is gradually increased to 1, and the weight coefficient β is gradually reduced to 0. According to this, the control can smoothly be switched to steering control. Immediately after the steering control is started, the value of the weight coefficient β is relatively large. Therefore, the torque generated by the steering control is close to assisting torque before the steering control is started. A reason why the initial value of steering torque Trq when the steering control is started is set to a value close to the assisting torque is that in the electric power steering wheel 14, torque for realizing the tire angle θ is the sum of the assisting torque and torque applied to the steering wheel 10. In the period during which the weight coefficient α is small, it is preferable that the integral element is kept stopped or a gain is reduced.

<Fourth Embodiment>

A fourth embodiment will be described below with reference to the drawings with a focus on differences from the first embodiment.

In the fourth embodiment, it is determined whether steering corresponding to an input operation performed on a steering wheel 10 and steering carried out by steering control have consistency greater than or equal to a predetermined value based on the deviation degree between steering torque corresponding to the input operation performed on the steering wheel 10 and steering torque corresponding to a tire angle command value θ*.

Figure 9:
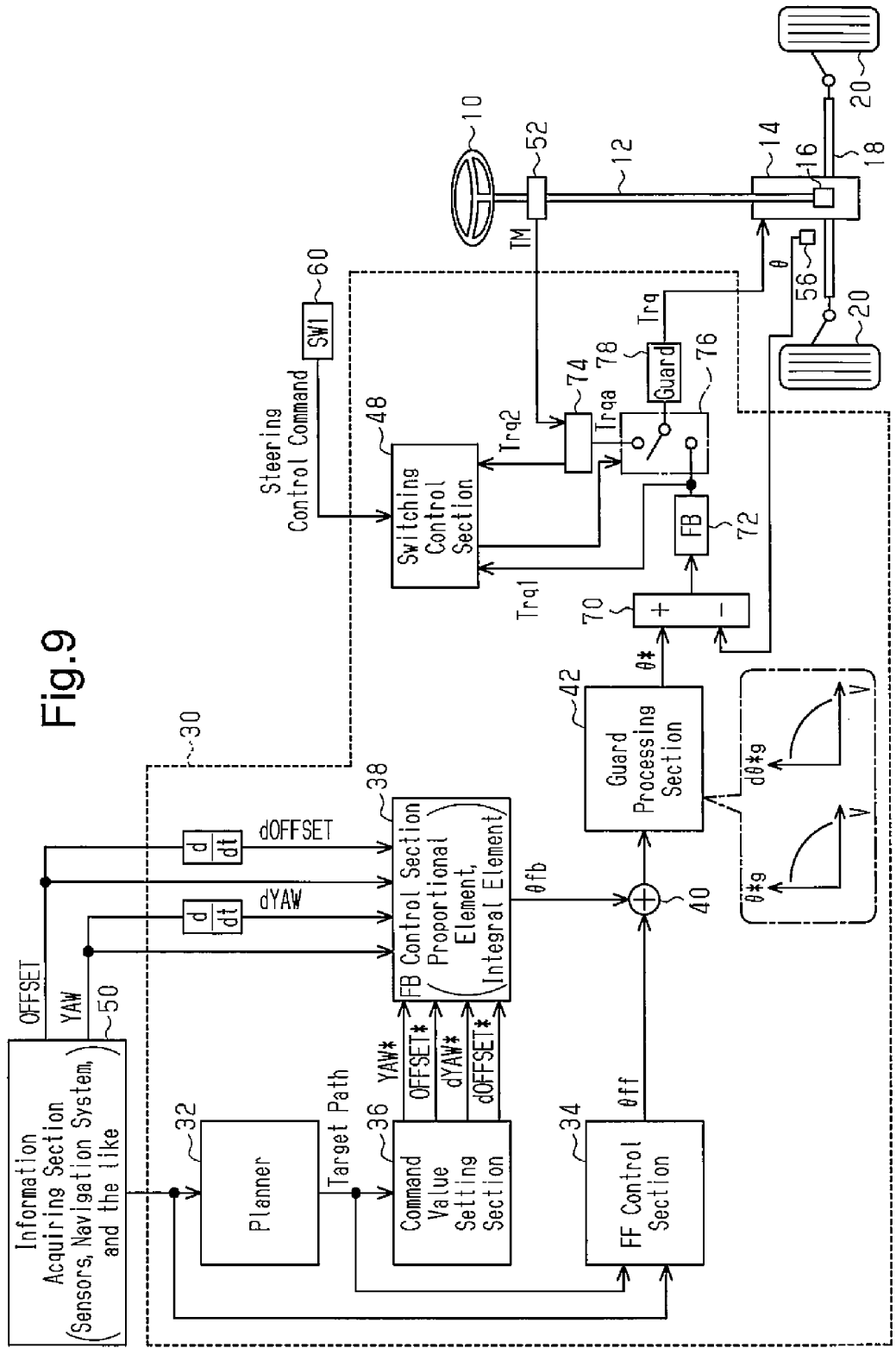
FIG. 9 is a block diagram according to a fourth embodiment.

FIG. 9 shows a system according to the fourth embodiment. In FIG. 9, the same reference numerals are allocated to processing and components corresponding to those shown in FIG. 1 for convenience sake.

As shown in FIG. 9, in the fourth embodiment, a tire angle command value θ*, which is output from a guard processing section 42, is input to a deviation computation section 70. The deviation computation section 70 outputs a value obtained by subtracting the tire angle θ from the tire angle command value θ* to a tire angle feedback control section 72. The tire angle feedback control section 72 calculates and outputs steering torque Trq1 as an operation amount for feedback controlling the tire angle θ to the tire angle command value θ*.

When the steering control is not executed, a steering wheel torque calculating section 74 inputs torque TM applied to the steering wheel 10 to generates assisting torque Trqa for assisting an input operation performed on a steering wheel 10. When steering control is not executed, the steering wheel torque calculating section 74 inputs torque TM applied to the steering wheel, and calculates steering torque Trq2, which is actually applied to steered wheels 20 for realizing a tire angle θ including the torque TM.

A switching section 76 selectively outputs either one of the steering torque Trq1 or the assisting torque Trqa to a guard processing section 78. The guard processing section 78 carries out guard processing for an input value and outputs the processed input value to an electric power steering wheel 14 as a final steering torque Trq.

The switching section 76 is operated by the switching control section 48. In a manual driving state, if a state where the absolute value of the difference between the steering torque Trq1 and the steering torque Trq2 is less than or equal to a threshold value continues for a predetermined time period, the switching control section 48 determines that there is consistency greater than or equal to the predetermined value between steering corresponding to an input operation performed on the steering wheel 10 and steering carried out by steering control. If this determination is made, control is switched such that the switching section 76 outputs the steering torque Trq1.

According to the above-described fourth embodiment also, advantages similar to those of the first embodiment are obtained. Incidentally, since the steering torque Trq2 is also an amount in which a user's input operation performed on the steering wheel 10 is directly reflected, this steering torque Trq2 is a parameter capable of accurately determining whether there is consistency greater than or equal to the predetermined value. Therefore, an advantage similar to the advantage (5) is also obtained.

<Fifth Embodiment>

A fifth embodiment will be described below with reference to the drawings with a focus on differences from the first embodiment.

In the fifth embodiment, the deviation degree between a tire angle command value θ* and the tier angle θ is monitored, thereby determining whether there is consistency greater than or equal to a predetermined value between steering corresponding to an input operation performed on a steering wheel 10 and steering corresponding to steering control.

Figure 10:
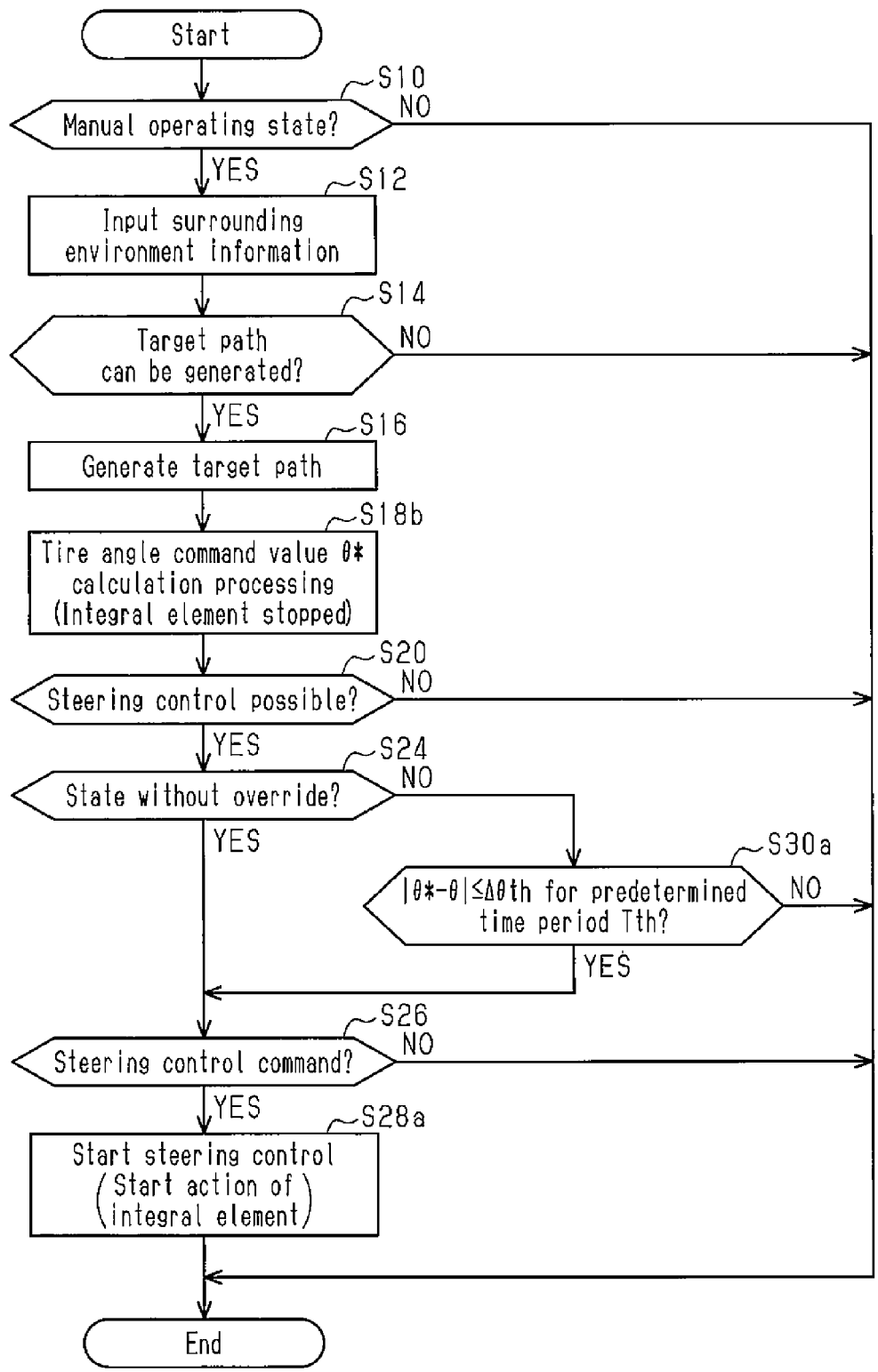
FIG. 10 is a flowchart showing procedure of a steering control starting processing according to a fifth embodiment.

FIG. 10 shows a procedure of starting processing of steering control according to the fifth embodiment. This processing is repeatedly executed by a control device 30 at predetermined intervals, for example. In the processing shown in FIG. 10, the same step numbers are allocated to processing corresponding to that shown in FIG. 4 for convenience sake.

In series of processing shown in FIG. 10, when processing in step S16 is completed, the control device 30 calculates the tier angle command value θ* (S18b). At this time, an integral element of a feedback control section 38 is stopped as in the first embodiment, but calculating processing of a steering angle command value θs* is not executed.

When a negative determination is made in step S24, the control device 30 determines whether a state where the absolute value of the difference between the tier angle command value θ* and the tier angle θ is less than or equal to a threshold value Δθth continues for the predetermined time period Tth or more (S30a). In this processing, it is determined whether there is consistency greater than or equal to a predetermined value between steering corresponding to an input operation performed on a steering wheel 10 and steering corresponding to steering control. When a positive determination is made in step S30a, the control device 30 shifts processing to step S26.

<Sixth Embodiment>

A sixth embodiment will be described below with reference to the drawings with a focus on differences from the first embodiment.

In the sixth embodiment, a parameter that is referred to for determining whether there is consistency greater than or equal to a predetermined value between steering corresponding to an input operation performed on a steering wheel 10 and steering corresponding to steering control is defined as a control amount of a feedback control section 38.

Figure 11:
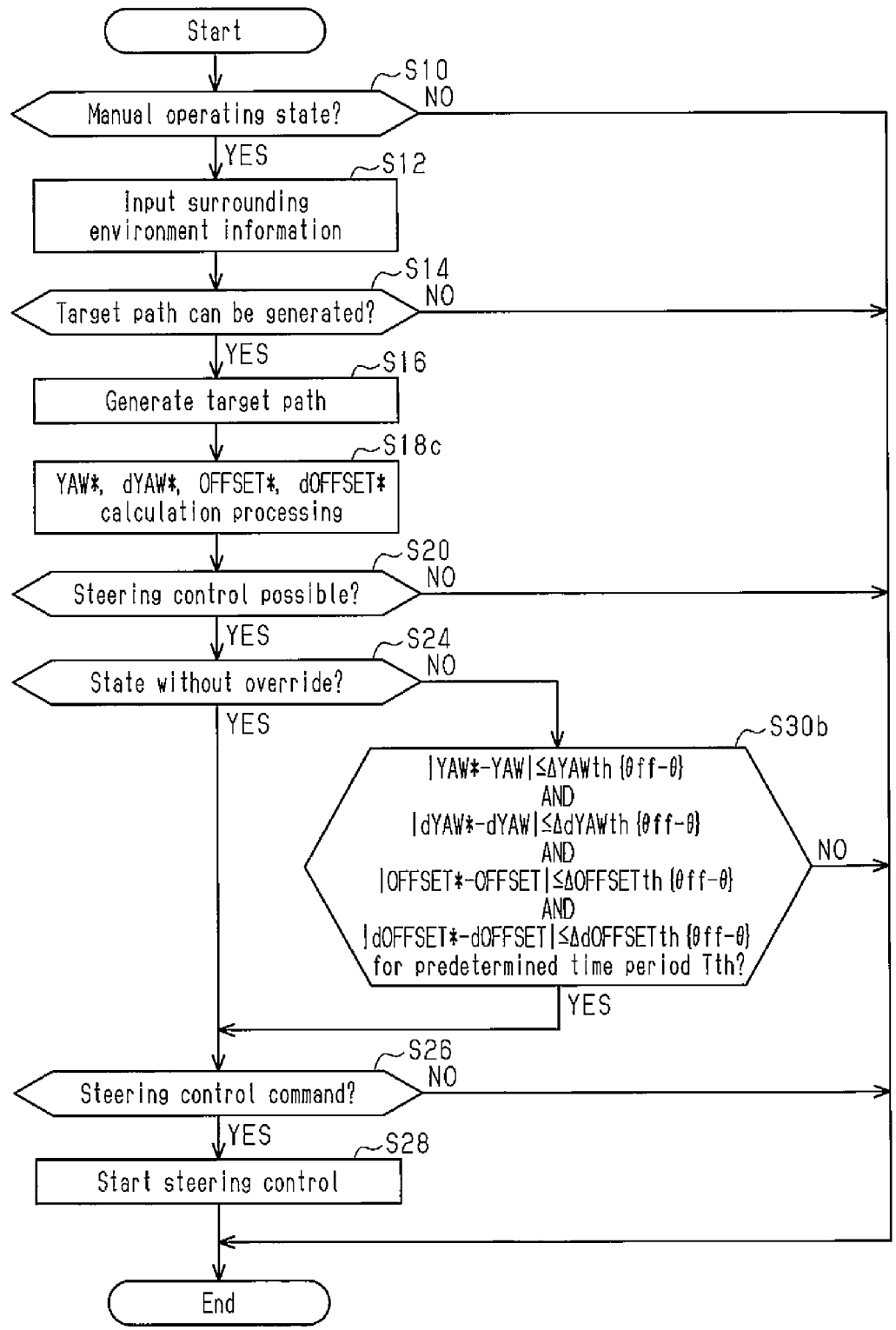
FIG. 11 is a flowchart showing procedure of a steering control starting processing according to a sixth embodiment.

FIG. 11 shows a procedure of starting processing of steering control according to the sixth embodiment. This processing is repeatedly executed by a control device 30 at predetermined intervals, for example. In the processing shown in FIG. 11, the same step numbers are allocated to processing corresponding to that shown in FIG. 4 for convenience sake.

In series of processing shown in FIG. 11, when processing in step S16 is completed, the control device 30 calculates a yaw angle command value YAW*, a yaw rate command value dYAW*, a lateral direction position command value OFFSET* and a lateral direction speed command value dOFFSET* (S18c). When a negative determination is made in step S24, the control device 30 determines whether the following states (A) to (D) continue for the predetermined time period Tth or more (S30b).

(A) a state where the absolute value of the difference between the yaw angle YAW and the yaw angle command value YAW* is less than or equal to a threshold value ΔYAWth, (B) a state where the absolute value of the difference between the yaw rate dYAW and the yaw rate command value dYAW* is less than or equal to a threshold value ΔdYAWth, (C) a state where the absolute value of the difference between the lateral direction position OFFSET and the lateral direction position command value OFFSET* is less than or equal to a threshold value ΔOFFSET, and (D) a state where the absolute value of the difference between the lateral direction speed dOFFSET and the lateral direction speed command value dOFFSET* is less than or equal to a threshold value ΔdOFFSET.

The threshold values ΔYAWth, ΔdYAWth, ΔOFFSET and ΔdOFFSET are variably set in accordance with the difference between a feedforward amount Off and the tier angle θ. This is because if processing carried out by a guard processing section 42 is ignored, of the difference between the tire angle command value θ* and the tire angle θ, an amount which is ascribable to output of a feedback control section 38 is the difference between the feedforward amount Off and the tire angle θ.

When a positive determination is made in step S30b, the control device 30 shifts processing to that shown in step S26.

According to the above-described sixth embodiment, the following advantage is obtained in addition to the advantages (1) to (3) and (6) to (10) of the first embodiment.

(14) The threshold values ΔYAWth, ΔdYAWth, ΔOFFSET and ΔdOFFSET are variably set in accordance with the difference between the feedforward amount Off and the tire angle θ. According to this, the frequency at which it is determined that there is consistency greater than or equal to the predetermined value can be increased, and the switching frequency to steering control can be increased.

<Seventh Embodiment>

A seventh embodiment will be described below with reference to the drawings with a focus on differences from the first embodiment.

The seventh embodiment employs such a configuration in which characteristics of a steering control switch 60 are changed. That is, even if the switch 60 is pressed down and a steering control command is output, the state where the command is output is canceled if the switch 60 is not pressed down any more.

Figure 12:
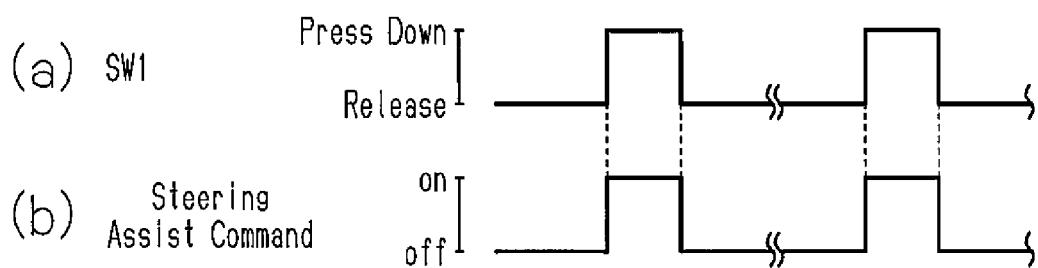
FIG. 12 is a time chart showing characteristics a steering control switch according to a seventh embodiment.

FIG. 12 shows the characteristics of the steering control switch 60 of the seventh embodiment. More specifically, (a) shows changes of an operation performed on the steering control switch 60, and (b) shows changes whether the current state is a state where the steering control command is output. As shown in FIG. 12, in the seventh embodiment, if the steering control switch 60 is pressed down, the steering control command is output but if the steering control switch 60 is released from the pressed down state, the state is brought into a state where the steering control command is not output.

In this seventh embodiment, a control device 30 does not execute processing of storing, for a long term, a fact that the steering control command is output. Hence, in the processing shown in FIG. 4, as long as the steering control switch 60 is not pressed down after a positive determination is made in step S30, it is not positively determined in step S26. Hence, when a positive determination is made in step S30, it is preferable to inform a user that control can be switched to steering control. This can be realized by turning on a lamp which shows whether the steering can be started.

According to the above-described seventh embodiment, the following advantage is obtained in addition to the advantages (1) to (9) of the first embodiment.

(15) The steering control switch 60 does not hold information when the switch 60 is operated. According to this, when steering control can actually be executed, it is easy to set such that steering control is not executed as long as the steering control switch 60 is not operated, and it is possible to sufficiently prevent the steering control from being started when the start of the steering control is not a user's intention.

<Eighth Embodiment>

An eighth embodiment will be described below with reference to the drawings with a focus on differences from the seventh embodiment.

In the eighth embodiment, a steering control switch 60 that is the same as that of the seventh embodiment is employed. In the eighth embodiment, if the steering control switch 60 is pressed down, determination whether there is consistency greater than or equal to a predetermined value is executed.

Figure 13:
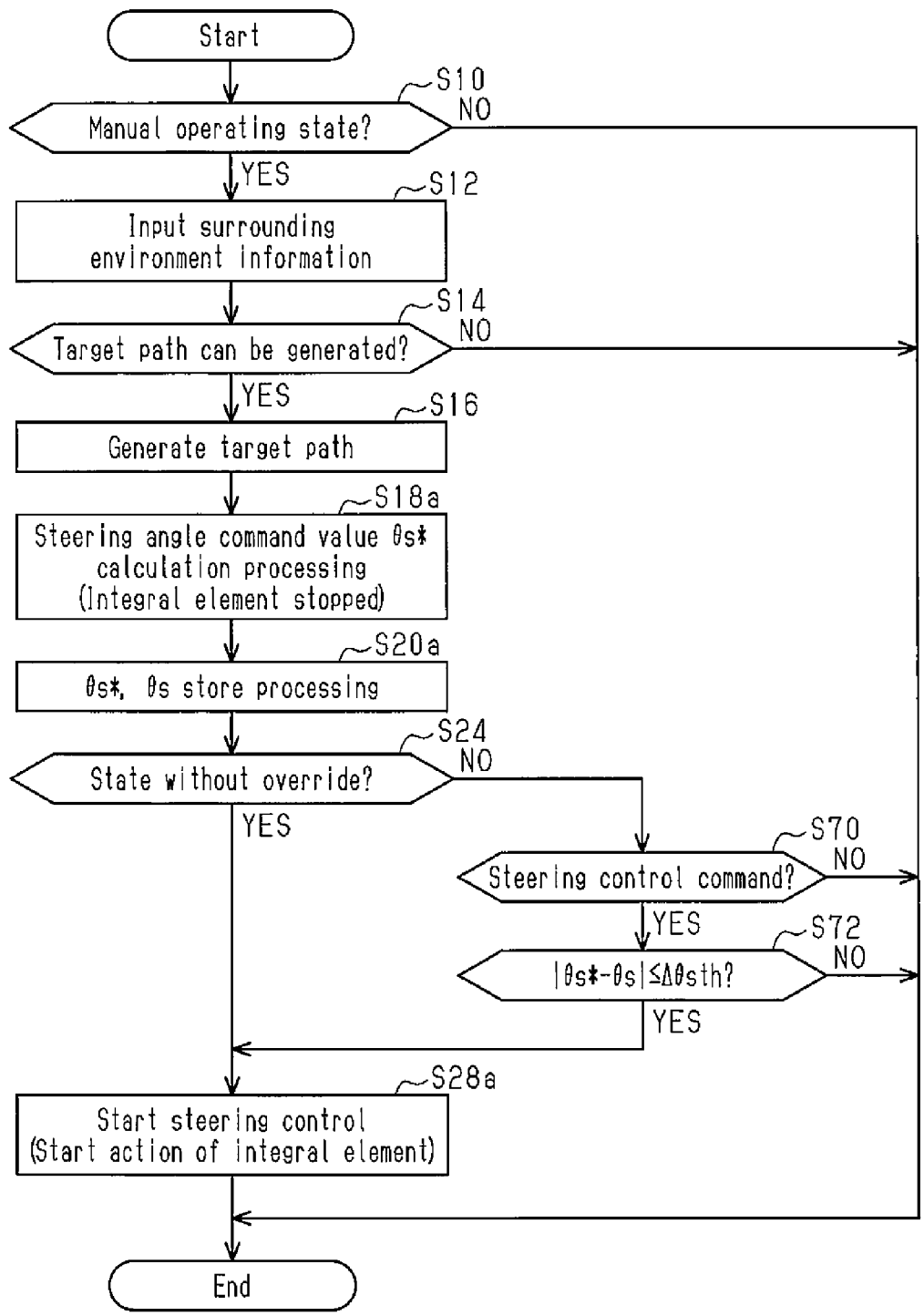
FIG. 13 is a flowchart showing procedure of a steering control starting processing according to an eighth embodiment.

FIG. 13 shows a procedure of starting processing of steering control according to the eighth embodiment. This processing is repeatedly executed by a control device 30 at predetermined intervals, for example. In the processing shown in FIG. 13, the same step numbers are allocated to processing corresponding to that shown in FIG. 4 for convenience sake.

In the processing shown in FIG. 13, when processing in step S18a is completed, the latest sampling values of the steering angle command value θs* and the steering angle θs are stored in a storage device such as a RAM (S20a). In this storing operation, a sampling value exceeding the predetermined time period Tth is erased. When a negative determination is made in step S24, the control device 30 determines whether a steering control command is output (S70). When it is determined that the steering control command is output (S70: YES), the control device 30 determines whether all of the absolute values of the differences between a steering angle command value θs* and a steering angle θs concerning sampling values of a past predetermined time period Tth that are stored in processing in step S20a are less than or equal to a threshold value Δθsth (S72). When a positive determination is made in step S72, the control device 30 determines that there is consistency greater than or equal to a predetermined value between steering corresponding to an input operation performed on a steering wheel 10 and steering corresponding to steering control, processing is shifted to step S28a.

According to the above-described eighth embodiment, the following advantage is obtained in addition to the advantages of the seventh embodiment.

(16) If the steering control switch 60 is pressed down, determination whether there is consistency greater than or equal to the predetermined value is executed. Therefore, it is possible to reduce the computation load of the control device 30.

<Ninth Embodiment>

A ninth embodiment will be described below with reference to the drawings with a focus on differences from the first embodiment.

In the ninth embodiment, a steering control switch 60 that is the same as that of the seventh embodiment is employed. In the ninth embodiment, after the steering control switch 60 is pressed down, the steering controller stands by for a specified time period before processing for switching control to steering control is executed.

Figure 14:
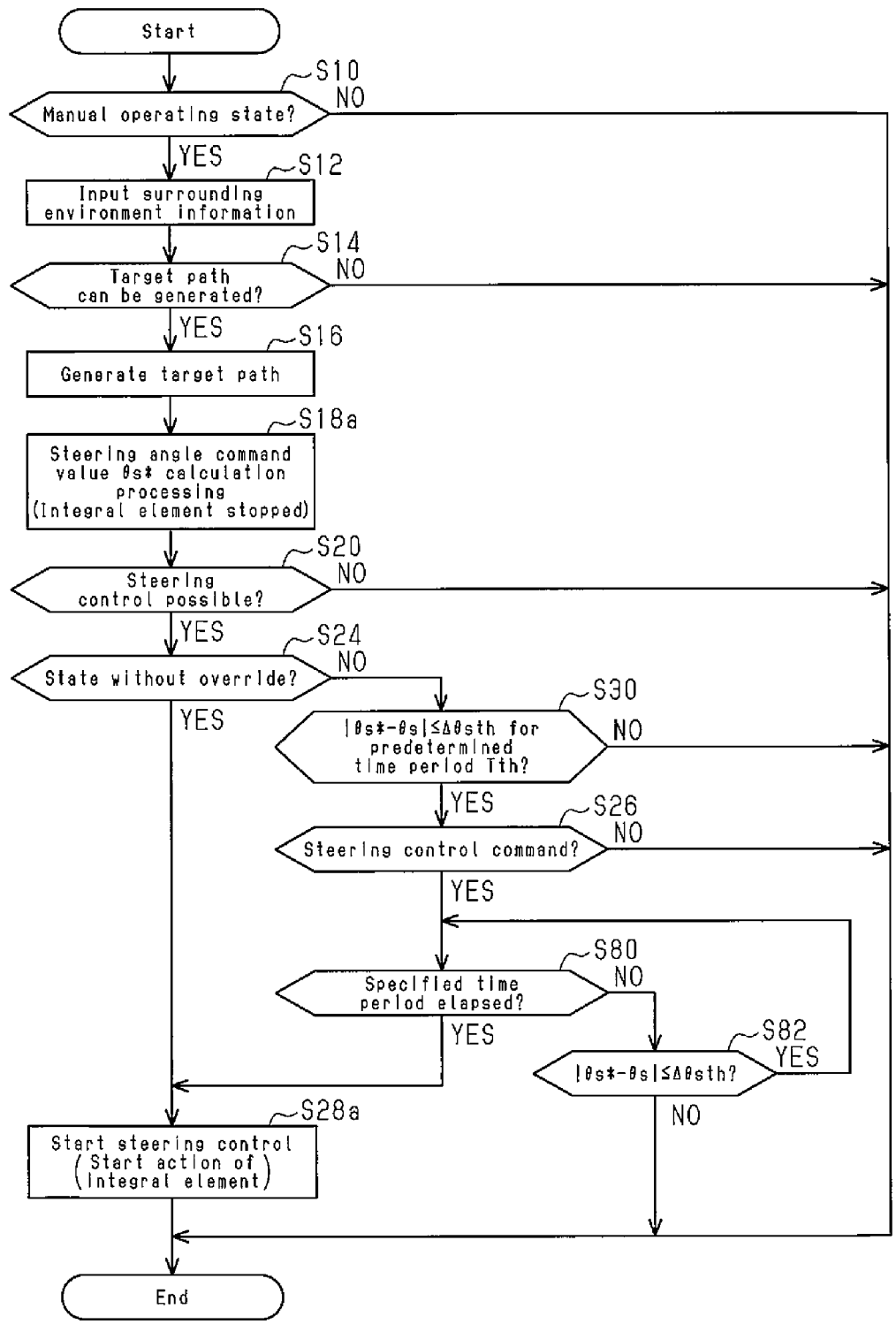
FIG. 14 is a flowchart showing procedure of a steering control starting processing according to a ninth embodiment.

FIG. 14 shows a procedure of starting processing of steering control according to the ninth embodiment. This processing is repeatedly executed by a control device 30 at predetermined intervals, for example. In the processing shown in FIG. 14, the same step numbers are allocated to processing corresponding to that shown in FIG. 4 for convenience sake.

In series of processing shown in FIG. 14, when a positive determination is made in step S30, it is determined whether a steering control command is output (S26). When a positive determination is made in step S26, the control device 30 determines whether the specified time period has elapsed after positive determination is made (S80). If it is determined that the specified time period has not elapsed (S80: NO), it is determined whether the absolute value of the difference between steering angle command value θs* and a steering angle θs is less than or equal to a threshold value Δθsth (S82). In this processing, it is continuously determined whether there is consistency greater than or equal to a predetermined value between steering corresponding to an input operation performed on a steering wheel 10 and steering corresponding to steering control. When a negative determination is made in step S82, the control device 30 temporarily suspends the series of processing shown in FIG. 14. On the other hand, when a positive determination is made in step S82, the control device 30 returns processing to step S80. When it is determined that the specified time period has elapsed (S80: YES), the control device 30 starts steering control (S28a).

According to the above-described ninth embodiment, the following advantage is obtained in addition to the advantages of the seventh embodiment.

(17) The steering control is delayed until the specified time period has elapsed after a steering control command is output. During that time, it is continuously determined whether there is consistency greater than or equal to a predetermined value between steering carried out by an input operation performed on a steering wheel 10 and steering carried out by steering control. According to this, when there is no consistency after the steering control switch 60 is operated, it is possible to reliably prevent control from being switched to steering control.

Incidentally, according to processing shown in FIG. 4, when a positive determination is made in step S26, although it is not always true that the absolute value of the difference between the steering angle command value θs* and the steering angle θs is less than or equal to a threshold value Δθsth, control is switched to steering control.

<Tenth Embodiment>

A tenth embodiment will be described below with reference to the drawings with a focus on differences from the first embodiment.

In the tenth embodiment, a steering control switch 60 that is similar to that of the seventh embodiment is employed. In the tenth embodiment, after the steering control switch 60 is pressed down, it is determined whether there is consistency greater than or equal to a predetermined value between steering corresponding to an input operation performed on a steering wheel 10 and steering corresponding to steering control.

Figure 15:
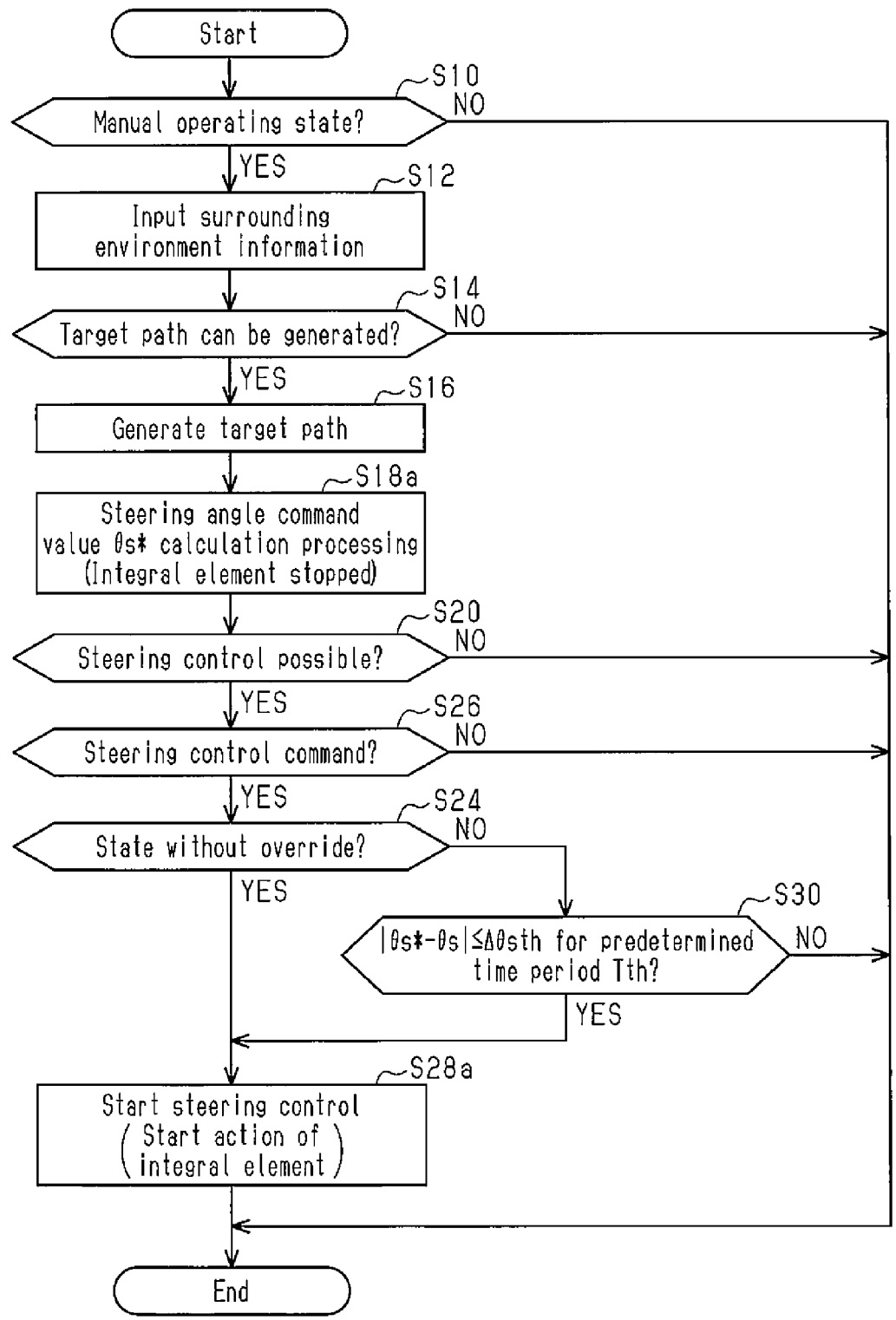
FIG. 15 is a flowchart showing procedure of a steering control starting processing according to a tenth embodiment.

FIG. 15 shows a procedure of starting processing of steering control according to the tenth embodiment. This processing is repeatedly executed by a control device 30 at predetermined intervals, for example. In the processing shown in FIG. 15, the same step numbers are allocated to processing corresponding to that shown in FIG. 4 for convenience sake.

In series of processing shown in FIG. 15, when a positive determination is made in step S20, the control device 30 determines whether a steering control command is output (S26). When it is determined that the steering control command is output (S26: YES) or it is determined whether there is no override (S24: YES) or it is determined whether there is consistency greater than or equal to a predetermined value (S30: YES), the control device 30 starts steering control (S28a).

<Correspondence Between Technical Ideas and Embodiments>

Representative correspondence between technical ideas described in the column "SUMMARY OF THE INVENTION" and embodiments will be described below.

Technical idea 1: the actuator . . . 16, 18, the operating section 10, 46, the operation amount . . . the torque for realizing tire angle θ, the calculating section . . . 34 to 46 in FIGS. 1, 34 to 42, 70, 72 in FIG. 9, the steering wheel . . . 10, the consistency determining section . . . S30, 30a, S30b, S72, the contribution ratio-increasing section . . . S28, 28a, 28b Technical idea 2:
the embodiments in which the steering angle corresponding to the input operation is input . . . the first to third and sixth to tenth embodiments,
the embodiment in which the tire angle corresponding to the input operation is input . . . the fifth embodiment, the embodiment in which the operation amount corresponding to input operation is input . . . the fourth embodiment Technical idea 3: the intermediate variable . . . YAW*, dYAW*, dOFFSET*, θ*, θs*

Technical idea 4: the command value of control amount . . . YAW*, dYAW*, dOFFSET*

Technical idea 5: see the feedback control section 38 in FIG. 1

Technical idea 6: see the first to tenth embodiments, especially the operation amount is used as computation parameter . . . see the fourth embodiment (FIG. 9), the steering angle corresponding to input operation . . . θs, the tire angle corresponding to input operation . . . θ, the command value of tire angle as intermediate variable . . . θ*, the command value of steering angle as intermediate variable . . . θs*

Technical idea 7: the deviation degree . . . |θs*−θs|, |θ*−θ|, the operation amount is used as computation parameter . . . see the fourth embodiment (FIG. 9), when command value of tire angle is regarded as an intermediate variable, θs* is normalized such that it has the same magnitude as θs but θs* itself can be regarded as an intermediate variable in FIG. 1 and the like Technical idea 8: the feedback control section . . . 38, the history reflecting section . . . integral element, the gain-reducing section . . . the integral element is stopped in S18a, the parameter located downstream . . . θ*, steering torque Technical idea 9: the sixth embodiment (FIG. 11)

Technical idea 10: S28b of the third embodiment (FIG. 8)

Technical idea 11:

the input section . . . 60, the condition under which information meaning that input section is permitted to execute is input . . . S26, S70

Technical idea 12: the detecting section . . . S26, S70 on presumption of characteristics of FIG. 12

Technical idea 13: see eighth embodiment (FIG. 13), the storing section . . . S18c, the detecting section . . . S70 on presumption of characteristics of FIG. 12

Technical idea 14: see FIG. 15

Technical idea 15: the steps S42, S44 of the second embodiment (FIG. 6)

Technical idea 16: step S46 of the second embodiment (FIG. 6)

<Other Embodiments>

The above embodiment may be modified as follows.

Concerning Calculating Section

The tire angle command value θ* is not limited to a value that is calculated by two-degree-of-freedom control of open loop control and feedback control. For example, the steering controller does not necessarily need to include the feedback control section 38, and the feedforward amount Off calculated by the feedforward control section 34 may be the tire angle command value θ*. Further, the steering controller does not necessarily need to include the feedforward control section 34, and the feedback amount θfb calculated by the feedback control section 38 may be the tire angle command value θ*.

The feedback control section 38 is not limited to a section including an integral element and a proportional element. For example, the steering controller may further include a differential element, or the steering controller may include only the proportional element. The control amount of the feedback control section 38 is not limited to the yaw angle YAW, the yaw rate dYAW, the lateral direction position OFFSET and the lateral direction speed dOFFSET, and the control amount may be portions thereof. The operation amount of the feedback control section 38 is not limited to the tire angle command value θ* and may be a steering torque.

The control device that inputs a feedback control amount and calculates an operation amount for controlling the tire angle θ is not limited to a so-called PID control device (the device that carries out P control, I control, D control, PI control, PD control, ID control, PID control).

The feedforward control section 34 may calculate an amount for open loop control using, as a control amount, at least one of the yaw angle YAW, the yaw rate dYAW, the lateral direction position OFFSET and the lateral direction speed dOFFSET. Other control of the calculating section is also described in the section titled "Concerning the target path".

Concerning the Predetermined History Reflection Computation Section and the Gain-Reducing Section Although the integral element is stopped in the first embodiment for example, the invention is not limited to this. For example, reduction processing may be performed before the steering control is started, in which, as compared with after the steering control is started, the magnitude of the absolute value of the gain of the integral element is reduced by a value other than zero.

For example, the feedback control section 38 may include a differential element, and the predetermined history reflection control section may include an integral element and a differential element. However, even when the feedback control section includes both the integral element and the differential element, a differential element does not necessarily need to be included in the predetermined history reflection control section in which gain is reduced by the gain-reducing section. This is because, it is only that the differential element makes a small number of sampling values such as immediately close sampling values reflect in output as sampling values that are older than the latest sampling value. That is, it is considered that when output is not reflected in an actual operation amount (steering torque) or when a reflection ratio is small, the degree by which reflection exerts influence on precision of determination is small.

Concerning the Consistency-determining Section

For example, an integral element of the feedback control section 38 may be operated at the time of manual operation, and an output value of the integral element may be used as a computation parameter as input for determining whether there is consistency greater than or equal to a predetermined value. Compared with a case where there is consistency greater than or equal to the predetermined value, if there is no consistency, it is considered that increasing speed of the absolute value of an output value of an integral element is increased. In view of this, attention is focused on the rate of change of the absolute value of the output value, so that the computation parameter can be realized.

It is determined whether there is consistency greater than or equal to the predetermined value based on a period during which the deviation degree of a pair of parameters is less than or equal to a predetermined value, but it does not necessarily need to be determined whether there is consistency greater than or equal to the predetermined value based on a period during which the absolute value of the difference between the steering angle command value θs* and the steering angle θs is less than or equal to a predetermined value. For example, it may be determined whether there is consistency greater than or equal to the predetermined value based on a period during which the absolute value of the rate of change of the difference between the steering angle command value θs* and the steering angle θs is less than or equal to prescribed speed and based on the difference at an arbitrary point in time when the absolute value of the rate of change is less than or equal to the prescribed speed. Further, when the absolute value of the steering angle command value θs* is greater than or equal to a predetermined value greater than zero, the ratio θs/θs* of the steering angle θs to the steering angle command value θs* is calculated, and it may be determined whether there is consistency greater than or equal to the predetermined value based on a period during which the absolute value of the difference between the calculated ratio and 1 is less than or equal to a predetermined value.

The determination does not necessarily need to be made based on the period during which the deviation degree is less than or equal to the predetermined value. For example, when the current absolute value concerning the difference between the steering angle command value θs* and the steering angle θs is less than or equal to a predetermined value and the absolute values of the current rate of changes of the steering angle command value θs* and the steering angle θs are less than or equal to a predetermined value, it may be determined that there is consistency greater than or equal to the predetermined value.

Instead of determining whether there is consistency greater than or equal to the predetermined value based on the difference between the steering angle command value θs* and the steering angle θs, it may be determined whether there is consistency greater than or equal to the predetermined value based on the difference between the steering angle θs and the steering angle command value (θff·Rs) that is determined from the feedforward amount Off for example.

Instead of determining whether there is consistency greater than or equal to the predetermined value based on any of the difference between the steering angle command value θs* and the steering angle θs, and the difference between steering torque Trq1 that is output by the tire angle feedback control section 72 and steering torque Trq2 by the steering wheel torque calculating section 74. The difference between the tire angle command value θ* and the tire angle θ may be added to this, and it is possible to use the difference between the tire angle command value θ* and the tire angle θ instead of the difference between the steering angle command value θs* and the steering angle θs.

As a technique for determining whether there is consistency greater than or equal to the predetermined value based on the tire angle or the steering angle, there is another technique described in the section titled "Concerning the normalization processing".

A configuration that does not use at least one of: the set of the steering angle θs and the steering angle command value θs*; the set of the tire angle θ and the tire angle command value θ*; and the set of the steering torque Trq1, which is output by the tire angle feedback control section 72, and the steering torque Trq2 by the steering wheel torque calculating section 74 is not limited to the configuration indicated in the sixth embodiment (FIG. 11). For example, it is possible to use a map that outputs two values in accordance with whether there is consistency greater than or equal to the predetermined value. As the map, a five dimensional map for inputting the following five parameters can be considered. That is, the difference between the yaw angle YAW and the yaw angle command value YAW*, the difference between the yaw rate dYAW and the yaw rate command value dYAW*, the difference between the lateral direction position OFFSET and the lateral direction position command value OFFSET*, the difference between the lateral direction speed dOFFSET and the lateral direction speed command value dOFFSET*, and the difference between the feedforward amount Off and the tire angle θ. According to this, it is considered that it is possible to determine in the same manner as that of the fifth embodiment (FIG. 10). This is because if the guard processing carried out by the guard processing section 42 is ignored, the determining processing in step S30a in FIG. 10 can be regarded as processing of determining whether the absolute value of the sum of the difference between the tire angle θ and the feedforward amount θff and the feedback amount θfb is less than or equal to the threshold value Δθth. Incidentally, the feedback amount θfb is determined by first four of the above-described five parameters. The determination by the map can also be realized by carrying out, for all of the parameters, the processing of varying threshold values of other values in accordance with one of the values of the five parameters. It is also possible to form a low dimension map by deleting some of the first four parameters from input of the map.

In addition to the above-described manners for determining whether there is consistency greater than or equal to the predetermined value, the determining processing may also be carried out by comparing, with each other, loci (predicted loci) in the near future of the vehicle. That is, it is possible to determine whether there is consistency greater than or equal to the predetermined value based on the deviation degree between a running locus predicted from the actual tire angle θ and steering angle θs and a running locus predicted from the tire angle command value θ* and the steering angle command value θs*. The predicting processing can be carried out based on average values of the tire angle and the steering angle during a predetermined period or based the current value and its variation ratio. As input parameters of the predicting processing, it is possible to add the yaw angle YAW, the yaw rate dYAW, the lateral direction position OFFSET, the lateral direction speed dOFFSET, and command values thereof.

In determination whether there is consistency greater than or equal to the predetermined value using steering torque as an operation amount in accordance with the tier angle θ, a steering angle θs and an input operation as a parameter concerning steering in accordance with an input operation performed on the steering wheel 10, it is not absolutely necessary to input them together with command values of corresponding tire angle command value θ*, steering angle command value θs* and steering torque. For example, after a state where a vehicle is deviated leftward from a running locus set by the planner 32 continues, it is considered that steering control tries to turn the vehicle rightward. Hence, when the steering wheel 10 is turned leftward at this time, it can be determined that there is no consistency. This determination can be made based on steering torque corresponding to the steering angle θs, the tier angle θ or an input operation of the steering wheel 10 and based on the running locus.

As a parameter concerning steering corresponding to an input operation performed on the steering wheel 10, it is not absolutely necessary to use steering torque as an operation amount corresponding to the tire angle θ, the steering angle θs and an input operation. For example, it is possible to quantitatively evaluate steering corresponding to an input operation performed on the steering wheel 10 based on at least one of the yaw rate dYAW and its variation ratio. At this time, it is possible to add the lateral direction speed dOFFSET and its variation ratio.

Concerning the Normalization Processing

In FIG. 1, since an input parameter of the EPS driving section 46 is set as the steering angle command value θs*, the steering angle command value θs* is an intermediate variable for calculating the steering torque Trq. However, if the input parameter of the EPS driving section 46 is set as the tire angle command value θ*, the steering angle command value θs* is not the intermediate variable for calculating the steering torque Trq. In this case, the steering angle command value θs* is a value in which the tire angle command value θ* as the intermediate variable is normalized by the steering wheel gear ratio Rs. In FIG. 1, however, since the tire angle command value θ* itself is an intermediate variable for calculating the steering torque Trq, the steering angle command value θs* is the intermediate variable and is also a value in which the tire angle command value θ* as an intermediate variable is normalized by the steering wheel gear ratio Rs at the same time.

In the first embodiment (FIGS. 1 and 4) and the like for example, the steering angle θs may be converted into a tire angle that is determined by the steering angle θs by multiplying the steering angle θs by the reciprocal of the steering wheel gear ratio Rs. In this case, based on the deviation degree between the converted value and the tire angle command value θ*, it is possible to determine whether there is consistency greater than or equal to the predetermined value between steering corresponding to an input operation performed on the steering wheel 10 and steering carried out by the steering control. The normalizing processing here is processing of converting a value into the magnitude of the tire angle unlike the processing used in the above embodiments (processing for converting a value into the magnitude of the steering angle). That is, to normalize one of a value concerning the tire angle and a value concerning a steering angle using steering wheel gear ratio information is to convert one of the value concerning the tire angle and the value concerning the steering angle into an amount of the other angle for making it possible to perform comparison between a large value and a small value. The conversion is not limited to conversion of a value into the amount of another value, and both values may be converted so that a large value and a small value can be compared with each other.

In the fifth embodiment (FIG. 10), it is possible to determine whether there is consistency greater than or equal to a predetermined value using the steering angle command value θs* and a value that is normalized by multiplying the tire angle θ by the reciprocal of the steering wheel gear ratio Rs.

Concerning the Contribution Ratio-increasing Section

The configuration is not limited to the processing of shifting a state (manual driving state) where steering is carried out in accordance with an input operation performed on the steering wheel 10 to steering control capable of bringing the contribution ratio of the input operation performed on the steering wheel 10 to zero. Concerning the basic steering torque for running on a curve for example, the configuration may be shifted to control for producing the steering torque in accordance with the input operation performed on the steering wheel 10 and for producing steering torque of assisting processing (lane keeping processing) to correct steering torque corresponding to the input operation of the steering wheel 10 so that a vehicle does not exceed a road marking line L. In this case, the contribution ratio is increased from 0% to a value smaller than 100%.

When this assisting processing is executed, it is possible to execute processing of shifting control to automatic steering control capable of bringing the contribution ratio of an input operation performed on the steering wheel 10 to zero. In this case also, it is effective to execute the shifting processing, provided there is consistency greater than or equal to the predetermined value between steering corresponding to the input operation performed on the steering wheel 10 and steering carried out by the steering control based on the difference and the like between the steering angle command value θs* and the steering angle θs.

Incidentally, it is possible to increase the contribution ratio in two stages, i.e., the lane keeping processing and the automatic steering control by bringing a weighted average (α·Trq 1+β·Trq 2) between the steering torque Trq1 determined from the steering angle command value θs* and the steering torque Trq2 determined from the steering angle θs into a final steering torque Trq, and by bringing its weight coefficients α and β into variable values. That is, in the lane keeping processing for example, α and β should be set such that if the vehicle nearly exceeds a white line, a correcting amount of minimum steering torque Trq1 that is required to prevent the vehicle from exceeding the white line. The present invention is not limited to this technique of path. As described in the section titled "Concerning the target path" for example, the steering controller may include a control system for controlling to prevent a vehicle from deviating or trying to deviate from a running-permissible region and a control system for controlling the vehicle to run on a locus as shown in FIG. 1. When the lane keeping processing is executed, only an operation amount concerning the preventing control is reflected on an actual operation amount. In this case, it is possible to determine whether there is consistency greater than or equal to the predetermined value in accordance with the first embodiment.

Concerning the Condition (Condition Other than Determination Carried Out by Consistency-determining Section) for Increasing the Contribution Ratio In the second embodiment (FIG. 7), processing in step S60 and processing in step S20 may be combined as one processing.

With the same intension as that of processing in step S44 in FIG. 7, when the difference between torque and rate of change corresponding to the steering angle command value θs* and a guard value by the EPS driving section 46 is less than or equal to a predetermined value, it is possible to evaluate that the reliability is low, and the fact that it is not evaluated here that the reliability is low may be included in execution conditions of steering control.

Concerning the Gradually Increasing Section

In the third embodiment (FIG. 8), when steering torque corresponding to an input operation is gradually shifted to steering torque corresponding to steering control, an operation amount (assisting torque) of the actuator immediately before steering control is started is employed, but the present invention is not limited to this. Since the weight coefficient β is shifted to 1, it is possible to employ, as steering torque corresponding to the input operation, steering torque (assisting torque) whenever it is determined in accordance with torque which is input to the steering wheel 10 before the shifting processing is completed.

Concerning the Calculating Processing

In the above embodiments, before steering control is started, calculating processing is not executed for a parameter downstream of calculation (on the calculation side of steering torque) of a parameter used for determining that steering control is started, but the present invention is not limited to this. In the first embodiment for example, processing of calculating steering torque corresponding to the steering angle command value θs* may be executed also before steering control is started.

Concerning the Override Determination

It may be determined that override is being carried out when the absolute value (absolute value of steering angle θs) of the steering wheel 10 is greater than or equal to a predetermined value, instead of determining that override is being carried out when torque input to the steering wheel 10 is greater than or equal to a predetermined torque value.

In FIG. 4 and the like for example, when it is determined that it is not the override state, the control device 30 starts steering control provided that a steering control command is output, but the invention is not limited to this. An execution condition of steering control that is different from a case where it is determined that it is the override state may further be added. When steering control is started, the override determination is not absolutely necessary. In FIG. 4 for example, processing in step S24 may be deleted. In this case also, a condition that a positive determination is made in processing in step S30 is an appropriate condition as a condition for starting the steering control.

Concerning a Method for Checking User's Intention Immediately Before Steering Control is Started The steering control switch 60 is not limited to a member that does not have a function to hold history of operation that is once carried out (FIG. 12). For example, the steering control switch 60 may hold the history (FIG. 3) and when steering control is started, it is possible to check user's intention by another method. This can be realized in such a manner that when a positive determination is made in step S30 in FIG. 4 in a state where the steering control switch 60 is turned ON, the user is informed that control can be started, and when the user releases his or her hands from the steering wheel 10, the steering control is started. Here, hand-releasing motion is declaration of the user's intention concerning execution of steering control carried out by the control device 30. Further, this can also be realized in such a manner that when a positive determination is made in step S30 in FIG. 4 in the state where the steering control switch 60 is turned ON, the user is informed that steering control is started and if intention to cancel is not shown within a predetermined period, the steering control is started. In this case, cancellation intention can be declared by turning off the steering control switch 60.

Concerning the Input Section

The input section (steering control switch 60), which allows the user to input information whether execution is permitted, is not absolutely necessary. In other words, for example, if a condition and the like in which a positive determination is made in step S30 in FIG. 4 are satisfied, it is possible to start the steering control without providing the input section, for example.

Concerning the Operation Amount

In the above embodiments, the electric power steering wheel 14 inputs the steering torque Trq, a portion in which a built-in motor is controlled to generate the torque is made as a black box, so that, when steering is controlled, the steering torque Trq is made as an operation amount in which the tire angle θ is a control amount, but the present invention is not limited to this. For example, a drive current value of the built-in motor may be made as an operation amount. Incidentally, this current value is for producing the steering torque Trq. In the fourth embodiment, when the drive current value is used as an operation amount, it is preferable that a steer-by-wire is used as the actuator.

Concerning the Target Path

The present invention is not limited to the configuration in which a locus of a representative point is set. By setting a prescribed margin between the vehicle and a pair of road marking lines that partitions a lane, for example, a running-permissible region (region having a length in direction perpendicular to the running direction larger than the vehicle width) of the vehicle may be set. In this case, as control carried out by the calculating section, the following two controls are conceived: 1) when the vehicle deviates from the running-permissible region, control is performed to prevent the vehicle from deviating; 2) when the vehicle tries to deviate, control is performed to prevent the vehicle from deviating.

Concerning the Actuator

The configuration is not limited to the electric power steering wheel 14 having one-to-one fixed correspondence between the steering angle θs and the tire angle θ. For example, a variable gear ratio steering variable (VGRS) device may be provided between the electric power steering wheel 14 and the steering wheel 10. According to this, the ratio of the tire angle θ to the steering angle θs is variable. A device that makes the ratio of the tire angle θ to the steering angle θs variable is not limited to this, and a steer-by-wire or the like may be employed, for example.

The ratio of the tire angle θ to the steering angle θs may be varied, for example, in the following case. That is, even when the ratio of the tire angle θ to the steering angle θs is set to a predetermined value, a period during which this ratio is deviated from the predetermined value may exist, in a precise sense, due response delay of the actuator. In view of this point, it is considered that it is better to use the steering angle θs instead of the tire angle θ for determining whether there is consistency greater than or equal to a predetermined value between steering in accordance with the user's intention and the steering carried out by the control device 30. In this case also, it is possible to use the difference between the tire angle command value θ* and the tire angle θ.

Concerning the Execution Conditions of the Steering Control

Several conditions other than those shown in the embodiments may further be added to the execution conditions of steering control. For example, it may positively be determined in the processing in step S10 when the logical conjunction of the state in which the current state is a manual driving state and the state in which active cruise control is being performed is true. The active cruise control is control for making the vehicle automatically run at a constant speed without depending on user's accelerator operation. The active cruise control is executed when a command meaning that a switch for exclusive use is pressed down and the active cruise control is executed is input when the vehicle is running at a vehicle speed more than a predetermined level on a road such as an expressway having no signals or intersections.

What is claimed is:

1. A vehicular steering controller comprising:
an operating section for operating an actuator for steering-controlling a tire angle;
a calculating section for calculating a target operation amount of the actuator based on a target path of a vehicle;
a consistency-determining section, wherein, when a steering angle of a steering wheel is greater than or equal to a predetermined angle, the consistency-determining section determines whether consistency between first steering of the vehicle corresponding to an input operation performed on the steering wheel and second steering based on the target path is greater than or equal to a predetermined value; and
a contribution ratio-increasing section, wherein, when the operating section operates the actuator based on the input operation performed on the steering wheel, the contribution ratio-increasing section increases a contribution ratio in which the target operation amount contributes to an actual operation amount of the actuator by the operating section, provided that the consistency-determining section determines that the consistency is greater than or equal to the predetermined value.

2. The vehicular steering controller according to claim 1, wherein the consistency-determining section is configured to input, as a parameter concerning the first steering, at least one of a steering angle by the input operation performed on the steering wheel, a tire angle corresponding to the input operation, and an operation amount corresponding to the input operation, and to determine whether the consistency is greater than or equal to the predetermined value.

3. The vehicular steering controller according to claim 1, wherein the consistency-determining section is configured to input a computation parameter as either one of an intermediate variable generated by the calculating section or the target operation amount, and to determine whether consistency between the first steering and steering that is realized if the contribution ratio is increased is greater than or equal to a predetermined value.

4. The vehicular steering controller according to claim 3, wherein the calculating section is configured to set, as the intermediate variable, a command value of a control amount for making a path of the vehicle match with the target path, and to calculate an operation amount of the actuator to control the control amount to the command value.

5. The vehicular steering controller according to claim 4, wherein the control amount includes at least one of a yaw angle of the vehicle, a yaw rate, and speed in a direction perpendicular to a travelling direction of the vehicle in a lane.

6. The vehicular steering controller according to claim 3, wherein
the consistency-determining section is configured to input, as a parameter concerning the first steering, at least one of a steering angle corresponding to an input operation performed on the steering wheel, a tire angle corresponding to the input operation, and an operation amount corresponding to the input operation, and to determine whether the consistency is greater than or equal to a predetermined value, and
a dimension of the computation parameter is the same as that of the any one of a command value of the tire angle as the intermediate variable that is input as a parameter concerning the first steering, a command value of a steering angle as the intermediate variable, and the target operation amount.

7. The vehicular steering controller according to claim 6, wherein the consistency-determining section is configured to determine that the consistency is greater than or equal to the predetermined value, provided that a period is longer than or equal to a predetermined time period, during which period at least one of the following deviation degrees is less than or equal to a predetermined value,
a deviation degree when normalization is carried out as necessary to equalize units of magnitude between a command value of a tire angle as the intermediate variable or a command value of a steering angle and a steering angle corresponding to the input operation or a tire angle corresponding to the input operation, and
a deviation degree between an operation amount corresponding to an input operation performed on the steering wheel and the target operation amount.

8. The vehicular steering controller according to claim 3, wherein
the calculating section includes a feedback control section, the feedback control section includes
a history reflecting section for determining output based on a current sampling value concerning a feedback control amount and a predetermined number or more of past sampling values, and
a gain-reducing section, wherein, when contribution ratio-increasing processing is not yet carried out, the gain-reducing section reduces a gain of processing of determining the output by the history reflecting section as compared with a case where the contribution ratio-increasing processing is carried out,
the consistency-determining section is configured to input the computation parameter by the calculating section in a state where gain-reducing processing is carried out by the gain-reducing section, and to determine whether the consistency is greater than or equal to the predetermined value, and
the computation parameter that is input to the consistency-determining section is a parameter located downstream of the history reflecting section.

9. The vehicular steering controller according to claim 5, wherein the consistency-determining section is configured to input an actual value concerning the corresponding control amount and at least one of a command value of a yaw angle of the vehicle as a command value of the control amount, which is the intermediate variable, a command value of a yaw rate, and a command value of speed in a direction perpendicular to a travelling direction of the vehicle in a lane, and to determine whether the consistency is greater than or equal to the predetermined value.

10. The vehicular steering controller according to claim 1, wherein
the contribution ratio-increasing section includes a gradually increasing section, and
the gradually increasing section increases the contribution ratio by gradually shifting an actual operation amount to an operation amount that is realized by increasing the contribution ratio from an operation amount corresponding to the input operation.

11. The vehicular steering controller according to claim 1, further comprising an input section through which a user inputs instructions indicating whether the contribution ratio-increasing section is permitted to execute contribution ratio-increasing processing,
wherein a condition for permitting the contribution ratio-increasing section to increase the contribution ratio includes a condition that execution permission is input to the input section.

12. The vehicular steering controller according to claim 11, further comprising a detecting section for detecting that the execution permission is input to the input section,
wherein a condition for permitting the contribution ratio-increasing section to increase the contribution ratio includes a condition that the detecting section detects input of the execution permission after the consistency-determining section determines that the consistency is greater than or equal to the predetermined value.

13. The vehicular steering controller according to claim 11, further comprising:
a detecting section for detecting that the execution permission is input to the input section; and
a storing section for storing an input parameter for determining whether the consistency is greater than or equal to the predetermined value,
wherein, when the detecting section detects input of the execution permission, the consistency-determining section determines whether the consistency is greater than or equal to the predetermined value based on time-series data of the input parameter that is stored in the storing section at a predetermined time period before the input is detected.

14. The vehicular steering controller according to claim 11, further comprising a detecting section for detecting that the execution permission is input to the input section,
wherein the consistency-determining section determines whether the consistency is greater than or equal to the predetermined value after the detecting section detects input of the execution permission during running of the vehicle.

15. The vehicular steering controller according to claim 1, wherein a condition for permitting the contribution ratio increasing section to increase the contribution ratio includes, in addition to the condition that the consistency-determining section determines that the consistency is greater than or equal to the predetermined value, at least one of (a) a condition that the reliability of recognition of a lane is greater than or equal to a predetermined level, and (b) a condition that at least one of the target operation amount and a tire angle corresponding to the target operation amount has a margin greater than or equal to a predetermined value.

16. The vehicular steering controller according to claim 1, wherein
the calculating section includes a feedback control section, and
a condition for permitting the contribution ratio increasing section to increase the contribution ratio includes, in addition to the condition that the consistency-determining section determines that the consistency is greater than or equal to the predetermined value, a condition that an absolute value of output of the feedback control section is less than or equal to a predetermined value.

* * * * *